US010409229B2

(12) United States Patent
Kawai

(10) Patent No.: US 10,409,229 B2
(45) Date of Patent: Sep. 10, 2019

(54) METHOD OF CONTROL DEVICE AND CONTROL DEVICE

(71) Applicant: FUJI ELECTRIC CO., LTD., Kawasaki-shi, Kanagawa (JP)

(72) Inventor: Fukiko Kawai, Hachioji (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 1192 days.

(21) Appl. No.: 14/679,588

(22) Filed: Apr. 6, 2015

(65) Prior Publication Data
US 2015/0212498 A1    Jul. 30, 2015

Related U.S. Application Data

(63) Continuation of application No. PCT/JP2013/081278, filed on Nov. 20, 2013.

(30) Foreign Application Priority Data

Nov. 30, 2012   (JP) .................................. 2012-263080
Jun. 10, 2013   (JP) .................................. 2013-121732

(51) Int. Cl.
    *G05B 11/42*    (2006.01)
    *G05B 19/19*    (2006.01)

(52) U.S. Cl.
    CPC .............. *G05B 11/42* (2013.01); *G05B 19/19* (2013.01); *G05B 2219/41368* (2013.01); *G05B 2219/42033* (2013.01); *Y02P 90/265* (2015.11)

(58) Field of Classification Search
    CPC .................... G05B 11/42; G05B 19/19; G05B 2219/41368; G05B 2219/42033; Y02P 90/265
    (Continued)

(56) References Cited

U.S. PATENT DOCUMENTS 6,854,285 B2 *   2/2005   Jessen ..................... F25B 49/02
                                                            236/92 B

FOREIGN PATENT DOCUMENTS

JP   H08-273827 A   10/1996
JP   2001-265408 A   9/2001
(Continued)

OTHER PUBLICATIONS

Tao Liu, Analytical design of two-degree-of-freedom control scheme for open-loop unstable processes with time delay, May 31, 2004, Elsevier, Journal of Process Control vol. 15 (Year: 2004).*
(Continued)

*Primary Examiner* — Robert E Fennema
*Assistant Examiner* — Christopher W Carter
(74) *Attorney, Agent, or Firm* — Manabu Kanesaka

(57) ABSTRACT

A method of designing a control device that controls a controlled variable of a plant to a set point, the control device including a feedback control system for outputting a manipulated variable of the plant based on an output of a feedback controller and a disturbance estimation value, including a step of selecting one of a first order transfer function, a second order transfer function, a third order transfer function, a first order and time delay transfer function, a second order and time delay transfer function, and a third order and time delay transfer function as a transfer function of the nominal plant in accordance with characteristics of the plant; and a step of determining a transfer function of the feedback controller based on a gain and time constant of the nominal plant.

11 Claims, 40 Drawing Sheets

(58) Field of Classification Search
USPC .......................................................... 700/42
See application file for complete search history.

(56) References Cited

FOREIGN PATENT DOCUMENTS

| JP | 2002-287804 A | 10/2002 |
|---|---|---|
| JP | 2005-148849 A | 6/2005 |
| JP | 2005-267296 A | 9/2005 |
| JP | 2008-097390 A | 4/2008 |
| JP | 2009-116515 A | 5/2009 |

OTHER PUBLICATIONS

K.J. Astrom, A New Smith Predictor for Controlling a Process with an Integrator and Long Dead-Time, Feb. 1994, IEEE Transactions on Automatic Control vol. 39, No. 2 (Year: 1994).*
Robert P. Copeland, A Fuzzy Logic Supervisor for PID Control of Unknown Systems, Aug. 1994, IEEE International Symposium on Intelligent Control (Year: 1994).*
PCT, "International Search Report for International Application No. PCT/JP2013/081278".
Karl J. Astrom, Tore Hagglund, "Advanced PID Control", The Instrumentation, Systems, and Automation Society (ISA), 2005.
Mitsuhiko Araki, "Unified View of I-PID, Differential Forward Type, and I-PID Control Two degree of freedom Control Systems", Systems and Controls, Japan Association of Automatic Control Engineers, 1985, vol. 29, Issue 10, pp. 649 to 656.
Mitsuhiko Araki, Hidefumi Taguchi, "Two degree of freedom PID Control Devices", Systems/Controls/Information, The Institute of Systems, Control, and Information Engineers, Jan. 15, 1998, vol. 42, Issue 1, pp. 18 to 25.
Europe Patent Office, "Search Report for European Patent Application No. 13859458.5," dated Jul. 28, 2016.
Nikolova, N., "Analysis and Synthesis of IMC-Control Systems," Bulgarian Academy of Sciences, Jan. 1, 2006, p. 22-30, vol. 6, No. 2, Cybernetics and Information Technologies, Sofia, Bulgaria.
Bequette, B. W., "Chapter 7: The IMC-Based PID Procedure," Mar. 12, 1999, p. 163-191.
Araki, H. et al., "Two-Degree-of-Freedom PID Controllers," International Journal of Control, Automation, and Systems, Dec. 1, 2003, p. 401-411, vol. 1, No. 4.
Izadi-Zamanabadi, R. et al., "Evaporator unit as a benchmark for Plug and Play and fault tolerant control," International Federation of Automotive Control, Aug. 29-31, 2012, p. 701-706, vol. 45, No. 20, Supervision and Safety of Technical Process (SAFEPROCESS), Mexico City, Mexico.
Hamane, H. et al., "Design of Decoupling System for Eliminating Disturbance on Extruder Temperature Control System," European Control Conference, Aug. 31, 1999, p. 1960-1965, Karlsruhe, Germany.

* cited by examiner

| Instrument | Manipulated Variable | Controlled Variable |
|---|---|---|
| Compressor 91 | Compressor rotation speed u1 | Evaporation pressure y1 |
| Condenser 92 | Fan rotation speed u2 | Condensation pressure y2 |
| Expansion valve 93 | Expansion valve open degree u3 | Evaporator degree of overheat y3 |
| Evaporator 94 | Fan rotation speed u4 | Supply temperature y4 |

Fig. 34

METHOD OF CONTROL DEVICE AND CONTROL DEVICE

RELATED APPLICATIONS

The present application is a Continuation Application of International Application No. PCT/JP2013/081278 filed Nov. 20, 2013, which claims priorities from Japanese Applications No. 2012-263080 filed Nov. 30, 2012 and No. 2013-121732 filed Jun. 10, 2013.

TECHNICAL FIELD

The present invention relates to a design method of a control device, and to a control device.

BACKGROUND ART

Feedback control systems have been widely applied to date as a control method in control devices. As shown in FIG. 39, in a feedback control system control device 2, a feedback controller 201 outputs a manipulated variable u based on the difference between a controlled variable y of a plant 9, calculated by an adder 202, and a set point r of the controlled variable y (r−y). Also, a feedback controller PID (Proportional-Integral-Derivative) control is still dominant as this kind of feedback controller.

Herein, a controlled variable, which is an output of a plant (plant), is a variable that is measured by a measuring instrument such as a sensor, and controlled so as to be a set point. Also, a manipulated variable, which is an output of a controller, is a variable that is manipulated so as to cause a controlled variable for tracking to conform to a set point.

However, it may happen that control of the plant 9 by the control device 2 is affected by disturbance d, as shown in FIG. 40. Although, in a PID control system, the effect of disturbance can be reduced by tuning PID parameters such as proportional gain, integral time, and derivative time, it may happen that there is a trade-off relationship between set point response and disturbance response.

Also, a method whereby disturbance is estimated and compensated for using a disturbance observer is also known. For example, a model reference adaptive control system including a disturbance observer, a reference model, and a sliding mode controller is disclosed in PTL 1. In this system, by converging deviation between a state variable estimation value output from the disturbance observer and a reference state variable output from the reference model, and outputting a control input by the sliding mode controller so as to attenuate the disturbance, balance between set point response and disturbance response is achieved.

CITATION LIST

Patent Literature

PTL 1: JP-A-2002-287804
PTL 2: JP-A-8-273827

Non Patent Literature

NPL 1: Karl J. Astrom, Tore Hagglund, "Advanced PID Control", The Instrumentation, Systems, and Automation Society (ISA), 2005
NPL 2: Mitsuhiko Araki, "Unified View of I-PID, Differential Forward Type, and I-PID Control Two degree of freedom Control Systems", Systems and Controls, Japan Association of Automatic Control Engineers, 1985, Volume 29, Issue 10, Pages 649 to 656
NPL 3: Mitsuhiko Araki, Hidefumi Taguchi, "Two degree of freedom PID Control Devices", Systems/Controls/Information, The Institute of Systems, Control, and Information Engineers, Jan. 15, 1998, Volume 42, Issue 1, Pages 18 to 25

SUMMARY OF INVENTION

Technical Problem

However, in the model reference adaptive control system of PTL 1, in order to design a disturbance observer and sliding mode controller, it is necessary to make a plant model by using state-space representation. Consequently, in order to introduce this system, an engineer with background in modern control theories dealing with state-space representation is needed. In particular, the design of a disturbance observer necessitates satisfying conditions such that coefficient matrix poles are stabilized, but as the method of satisfying the stabilizing conditions is left to the discretion of the engineer, knowhow, and trial and error are necessary. Because of this, design is difficult on site in the industrial world, and the system cannot be easily introduced.

Also, in a PID control system, when balancing set point response and disturbance response by tuning the PID parameters, the engineer needs to tune three parameters that affect each other by trial and error, which takes considerable time and effort.

Solution to Problem

A main aspect of an invention that resolves the heretofore described problems, is a method of designing a control device that controls a controlled variable of a plant to a set point. In the design method of control device, the control device comprises a feedback control system, which includes a feedback controller into which a difference between the set point and the controlled variable is input, and a disturbance feedback that outputs a disturbance estimation value that is the difference between an output of a nominal plant into which an output of the feedback controller is input, and the controlled variable multiplied by a feedback gain, and which outputs a manipulated variable of the plant based on the output of the feedback controller and the disturbance estimation value. The method of designing a control device comprises a step of selecting one of a first order transfer function, a second order transfer function, a third order transfer function, a first order and time delay transfer function, a second order and time delay transfer function, and a third order and time delay transfer function as a transfer function of the nominal plant depending on the characteristics of the plant, and determining a transfer function of the feedback controller based on a gain and time constant of the nominal plant.

Also, another main aspect of an invention that resolves the heretofore described problems, is a method of designing a control device configured as a set point filter type two degrees of freedom PID control system, which includes a filter into which a set point of a controlled variable of a plant is input, and a first feedback controller into which a difference between an output of the filter and the controlled variable is input, and that outputs a manipulated variable of the plant, and which controls the controlled variable to the set point. The design method of control device comprises a step of equivalently converting a feedback control system to the set point filter type two degrees of freedom PID control system, the feedback control system including a second feedback controller into which a difference between the set point and controlled variable is input, and a disturbance feedback that outputs a difference between an output of a nominal plant into which an output of the second feedback controller is input, and the controlled variable, with multiplying by a feedback gain, and in an equivalent conversion, determining both a transfer function of the filter and a transfer function of the first feedback controller based on the feedback gain, a transfer function of the second feedback controller, and a transfer function of the nominal plant.

Other characteristics of the invention are clear from the details of the attached figures and description.

Advantageous Effects of Invention

According to the invention, it is possible to easily design a control device such that set point response and disturbance response are balanced, without using state-space representation.

BRIEF DESCRIPTION OF DRAWINGS

FIG. 34 is a diagram showing the relationship between manipulated variables and controlled variables in the refrigeration cycle system shown in FIG. 32.

DESCRIPTION OF EMBODIMENTS

From the details of the description and the attached figures, at least the following items are clear.

(First Embodiment)
Design Method of Control Device

Hereafter, referring to FIG. 1 to FIG. 7, a description will be given of a design method of control device in a first embodiment.

Figure 1:
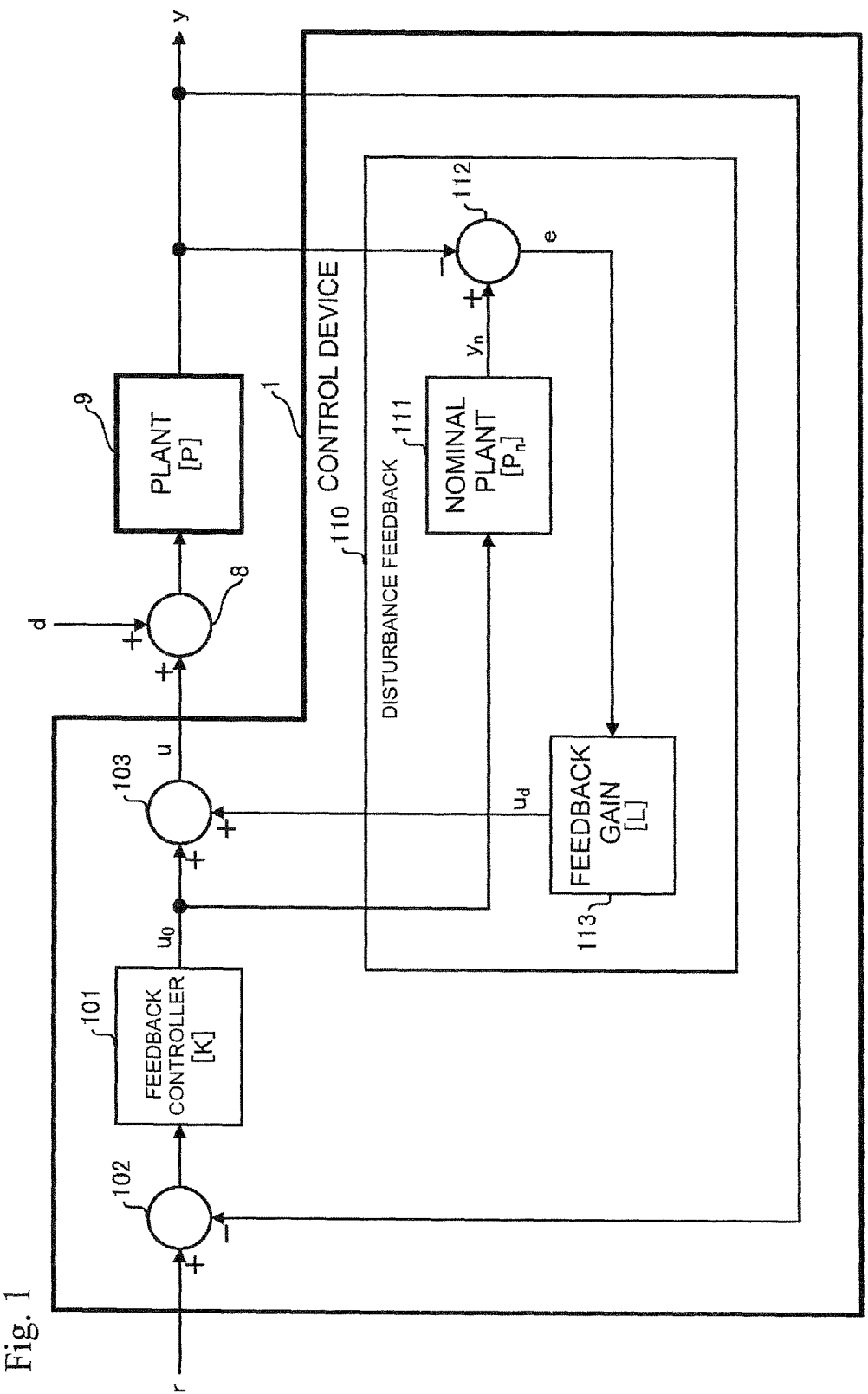
FIG. 1 is a block diagram showing a configuration of a feedback control system including a disturbance feedback according to a design method of control device in a first embodiment of the invention.

A control device of feedback control system 1 shown in FIG. 1 includes, in addition to a feedback controller 101 and adder 102, an adder 103 and disturbance feedback 110 in order to reduce the effect of disturbance d. Also, the disturbance feedback 110 includes a nominal plant 111, an adder 112, and a feedback gain 113.

A control output (controlled variable y) from a plant 9 and a set point r are input into the adder 102, and the difference between the set point r and controlled variable y(r−y) is input from the adder 102 into the feedback controller 101. Consequently, taking a transfer function of the feedback controller 101 to be K, an output $u_0$ of the feedback controller 101 is [Equation. 1]

$$u_0 = K(r-y) \tag{1}$$

The output $u_0$ of the feedback controller 101 is input into the nominal plant 111 of the disturbance feedback 110. Consequently, taking a transfer function of the nominal plant 111 to be $P_n$, an output $y_n$ of the nominal plant 111 is [Equation. 2]

$$y_n = P_n u_0 \tag{2}$$

Also, the output $y_n$ of the nominal plant 111 and the controlled variable y are input into the adder 112, and a difference e between the output $y_n$ of the nominal plant 111 and the controlled variable y ($=y_n-y$) is input from the adder 112 into the feedback gain 113. Consequently, taking the value of the feedback gain 113 to be L (hereafter called the feedback gain L), a disturbance estimation value $u_d$ output from the feedback gain 113 is [Equation. 3]

$$u_d = Le = L(y_n - y) \tag{3}$$

The output $u_0$ of the feedback controller 101 and the disturbance estimation value $u_d$ are input into the adder 103, and the sum of the output $u_0$ of the feedback controller 101 and the disturbance estimation value $u_d$ is output from the adder 102 as a control input (manipulated variable u) with respect to the plant 9. Consequently, the manipulated variable u is

[Equation. 4]

$$\begin{aligned} u &= u_0 + u_d \\ &= K(r-y) + L[P_n K(r-y) - y] \\ &= (K + LP_n K)r - (L + K + LP_n K)y \end{aligned} \tag{4}$$

Herein, the disturbance estimation value $u_d$, being estimated so as to attenuate the disturbance d, is negative when the disturbance d is positive, and positive when the disturbance d is negative. Further, by the disturbance estimation value $u_d$ added to the output $u_0$ of the feedback controller 101 in the adder 103, the disturbance d added to the manipulated variable u in an adder 8 is compensated.

The sign of the disturbance estimation value $u_d$ may be changed appropriately in accordance with the treatment of the disturbance estimation value $u_d$ in the adder 103 or the treatment of the disturbance d in the adder 8. For example, in FIG. 1, when the adder 103 is changed such that the disturbance estimation value $u_d$ is subtracted from the output $u_0$ of the feedback controller 101, the disturbance d can be attenuated by the disturbance estimation value $u_d$ estimated such that the reference sign corresponds with the disturbance d. Also, for example, in FIG. 1, when the adder 8 is changed such that the disturbance d is subtracted from the manipulated variable u, it is sufficient that the disturbance estimation value $u_d$ is estimated such that the reference sign corresponds with the disturbance d.

The transfer function $P_n$ of the nominal plant 111 is selected from six types, which are first order plant, second order plant, third order plant, first order and time delay plant, second order and time delay plant, and third order and time delay plant, depending on the characteristics of the plant 9. Specifically, firstly, the first order, second order, third order, first order and time delay, second order and time delay, and third order and time delay transfer functions of the nominal plant 111 are each identified from experiment or simulation data in accordance with a least squares method, a prediction error method, or the like. Also, with a conformity rate FIT shown in the following Equation (5) as an indicator, the conformity of each of the identified transfer functions with the experiment or simulation data is determined.

[Equation 5]

$$FIT = \left(1 - \frac{\sqrt{\sum_{k=1}^{N} [\hat{y}(k) - y(k)]^2}}{\sqrt{\sum_{k=1}^{N} [y(k) - \bar{y}]^2}}\right) \times 100 \quad (5)$$

Herein, N is the total number of data point (N points), and k (=1, ..., N) indicates the k-th points of data. Further, the transfer function with the highest conformity rate FIT at equation (5) is selected as the transfer function $P_n$ of the nominal plant 111.

The transfer function K of the feedback controller 101 is uniquely determined depending on the type of nominal plant 111 selected. In this embodiment, a Betrag method is used as an example of a method of determining the control parameters of the feedback controller 101 (for example, refer to PTL 2 and pages 198 and 199, "Modulus and Symmetrical Optimum" of NPL 1).

Figure 2:
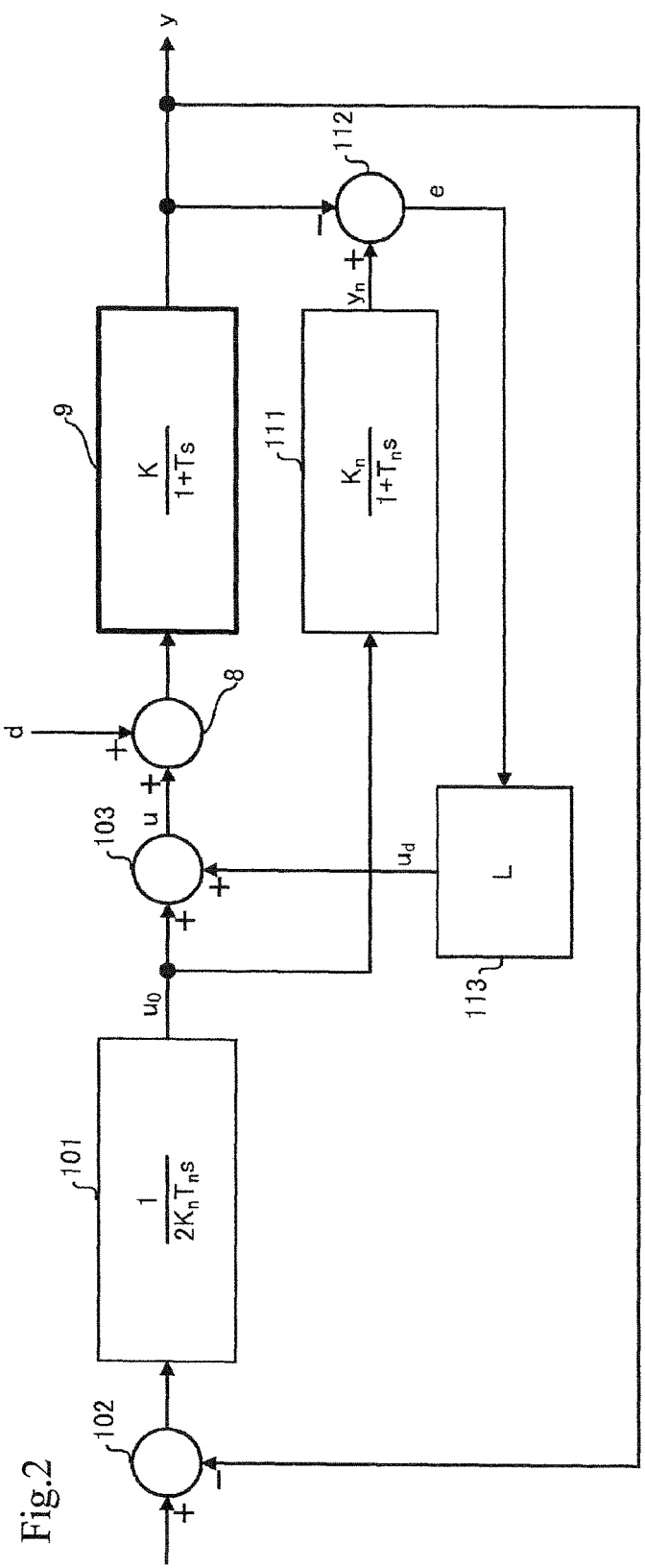
FIG. 2 is a block diagram showing a configuration of a feedback control system including a disturbance feedback including a first order nominal plant according to the design method of control device in the first embodiment of the invention.

FIG. 2 shows the configuration of the feedback control system when the nominal plant 111 is a first order plant. The transfer function $P_n$ of the nominal plant 111 in this case is described by the following Equation (6).

[Equation 6]

$$P_n = \frac{K_n}{1 + T_n s} \quad (6)$$

Herein, $K_n$ and $T_n$ are a gain and time constant respectively of the nominal plant 111. Further, using the gain $K_n$ and time constant $T_n$ of the nominal plant 111, the transfer function K of the feedback controller 101 is determined as in

[Equation 7]

$$K = \frac{1}{2K_n T_n s} \quad (7)$$

Figure 3:
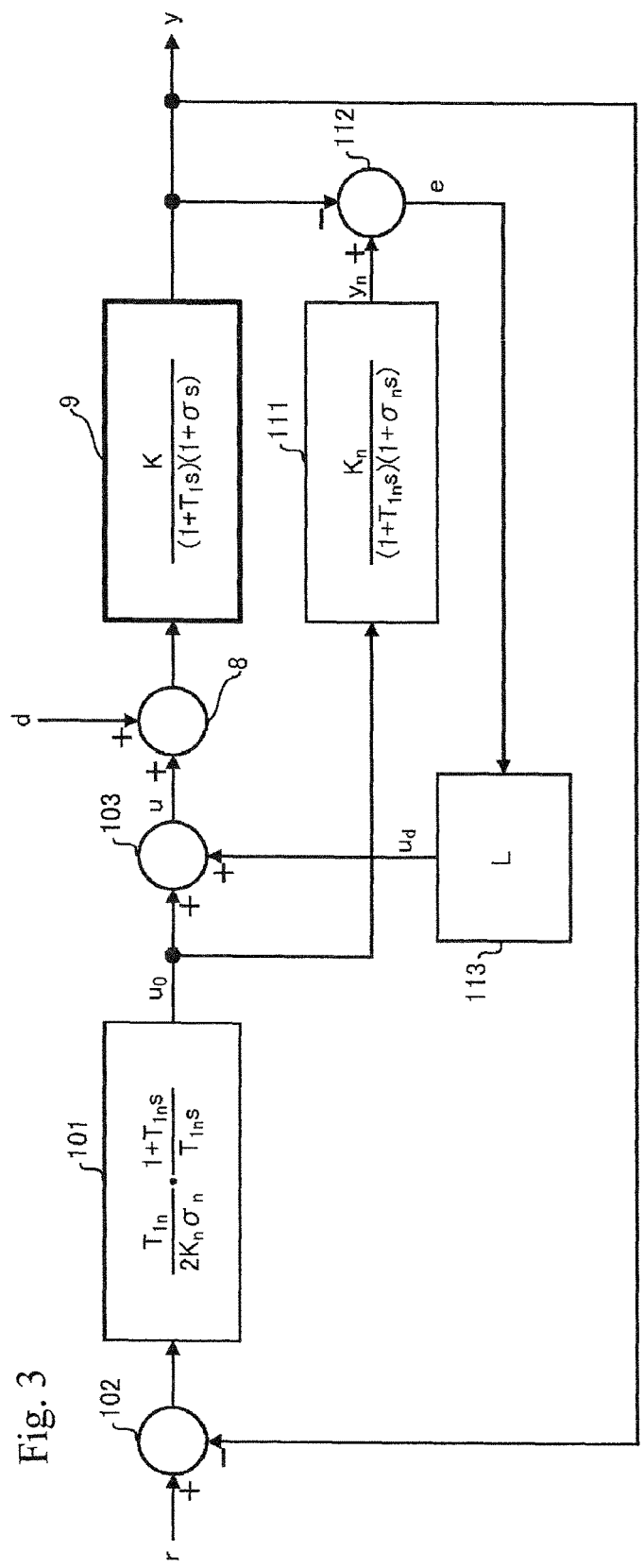
FIG. 3 is a block diagram showing a configuration of a feedback control system including a disturbance feedback including a second order nominal plant according to the design method of control device in the first embodiment of the invention.

FIG. 3 shows the configuration of the feedback control system when the nominal plant 111 is a second order plant. The transfer function $P_n$ of the nominal plant 111 in this case is described by the following Equation (8).

[Equation 8]

$$P_n = \frac{K_n}{(1 + T_{1n}s)(1 + \sigma_n s)} \quad (8)$$

Herein, $K_n$ and $T_{1n}$, $\sigma_n$ are the gain and time constants respectively of the nominal plant 111. As $\sigma_n < T_{1n}$ at this time, the characteristics of the nominal plant 111 (transfer function $P_n$) in this case are provided such that the longer time constant $T_{1n}$ is dominant. Therefore, the transfer function K of the feedback controller 101 is designed so as to attenuate the characteristics of the time constant $T_{1n}$. Further, using the gain $K_n$ and time constants $T_{1n}$, $\sigma_n$ of the nominal plant 111, the transfer function K of the feedback controller 101 is determined as in

[Equation 9]

$$K = \frac{T_{1n}}{2K_n \sigma_n} \cdot \frac{1 + T_{1n}s}{T_{1n}s} \quad (9)$$

Figure 4:
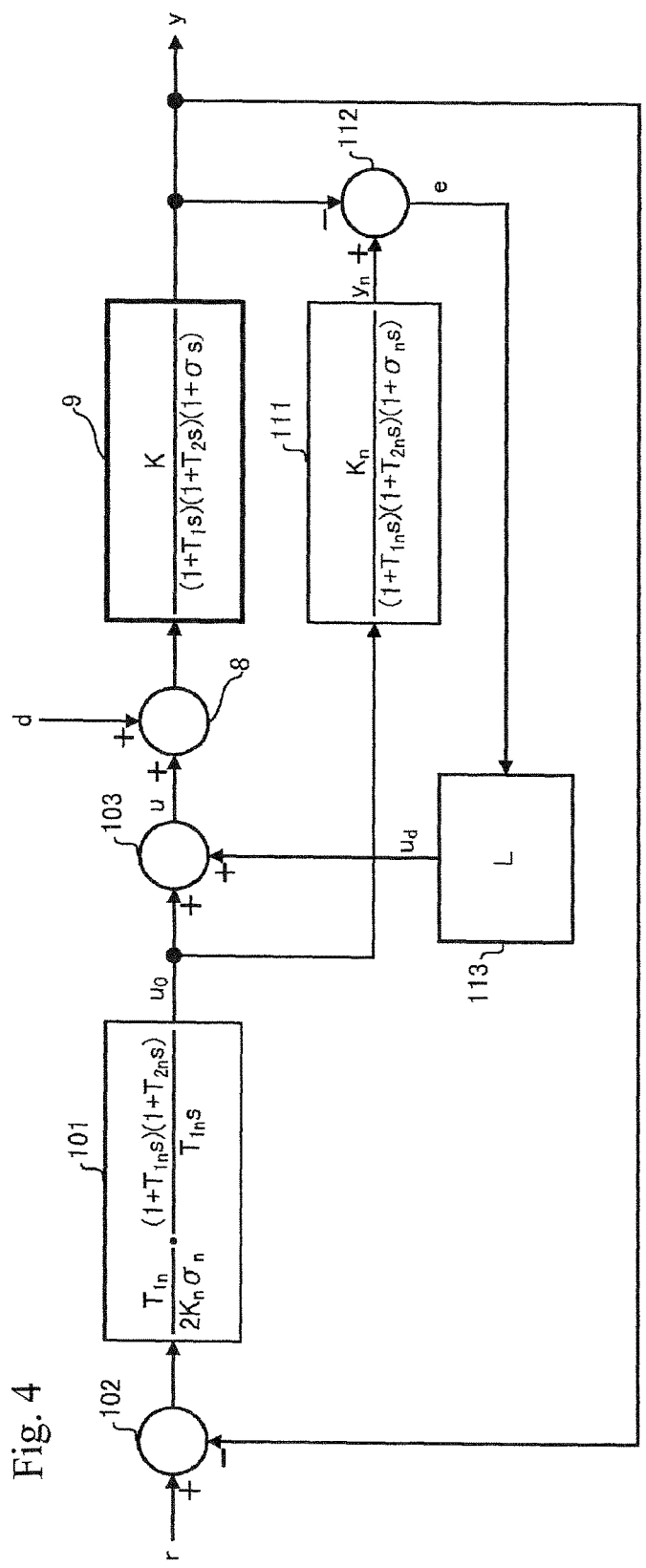
FIG. 4 is a block diagram showing a configuration of a feedback control system including a disturbance feedback including a third order nominal plant according to the design method of control device in the first embodiment of the invention.

FIG. 4 shows the configuration of the feedback control system when the nominal plant 111 is a third order plant. The transfer function $P_n$ of the nominal plant 111 in this case is described by the following Equation (10).

[Equation 10]

$$P_n = \frac{K_n}{(1 + T_{1n}s)(1 + T_{2n}s)(1 + \sigma_n s)} \quad (10)$$

Herein, $K_n$ and $T_{1n}$, $T_{2n}$, $\sigma_n$ are the gain and time constants respectively of the nominal plant 111. As $\sigma_n < T_{2n} < T_{1n}$ at this time, the characteristics of the nominal plant 111 (transfer function $P_n$) in this case are provided such that the longer time constants $T_{1n}$ and $T_{2n}$ are dominant. Therefore, the transfer function K of the feedback controller 101 is designed so as to attenuate the characteristics of the time constants $T_{1n}$ and $T_{2n}$. Further, using the gain $K_n$ and time constants $T_{1n}$, $T_{2n}$, $\sigma_n$ of the nominal plant 111, the transfer function K of the feedback controller 101 is determined as in

[Equation 11]

$$K = \frac{T_{1n}}{2K_n \sigma_n} \cdot \frac{(1 + T_{1n}s)(1 + T_{2n}s)}{T_{1n}s} \quad (11)$$

Figure 5:
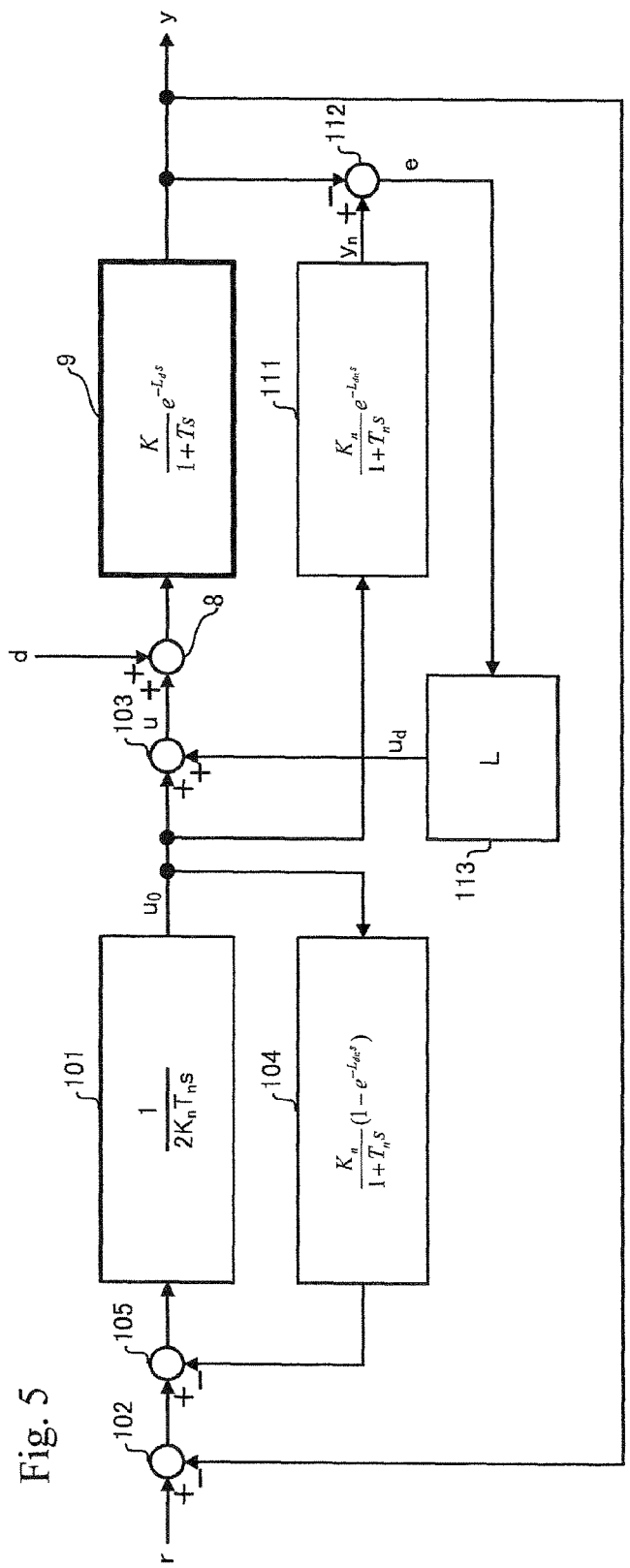
FIG. 5 is a block diagram showing a configuration of a feedback control system including a disturbance feedback including a first order and time delay nominal plant according to the design method of control device in the first embodiment of the invention.

FIG. 5 shows the configuration of the feedback control system when the nominal plant 111 is a first order and time delay. The transfer function $P_n$ of the nominal plant 111 in this case is described by the following Equation (12).

[Equation 12]

$$P_n = \frac{K_n}{1 + T_n s} e^{-L_{dn}s} \quad (12)$$

Herein, $K_n$, $T_n$, and $L_{dn}$ are the gain, time constant, and time delay respectively of the nominal plant 111. Also, a Smith compensator 104 into which the output $u_0$ of the feedback controller 101 is input, is appended to the feedback controller 101, and the difference between the output of the adder 102 and the Smith compensator 104 is input via an adder 105. At this time, a transfer function S of the Smith compensator 104 is expressed from the transfer function $P_n$ of the nominal plant 111 as in the following Equation (13).

[Equation 13]

$$S = \frac{K_n}{1 + T_n s}(1 - e^{-L_{dn} s}) \quad (13)$$

Meanwhile, the transfer function K of the feedback controller 101, in the same way as in the case of FIG. 2, is determined as in Equation (7) above, by using the gain $K_n$ and time constant $T_n$ of the nominal plant 111.

Figure 6:
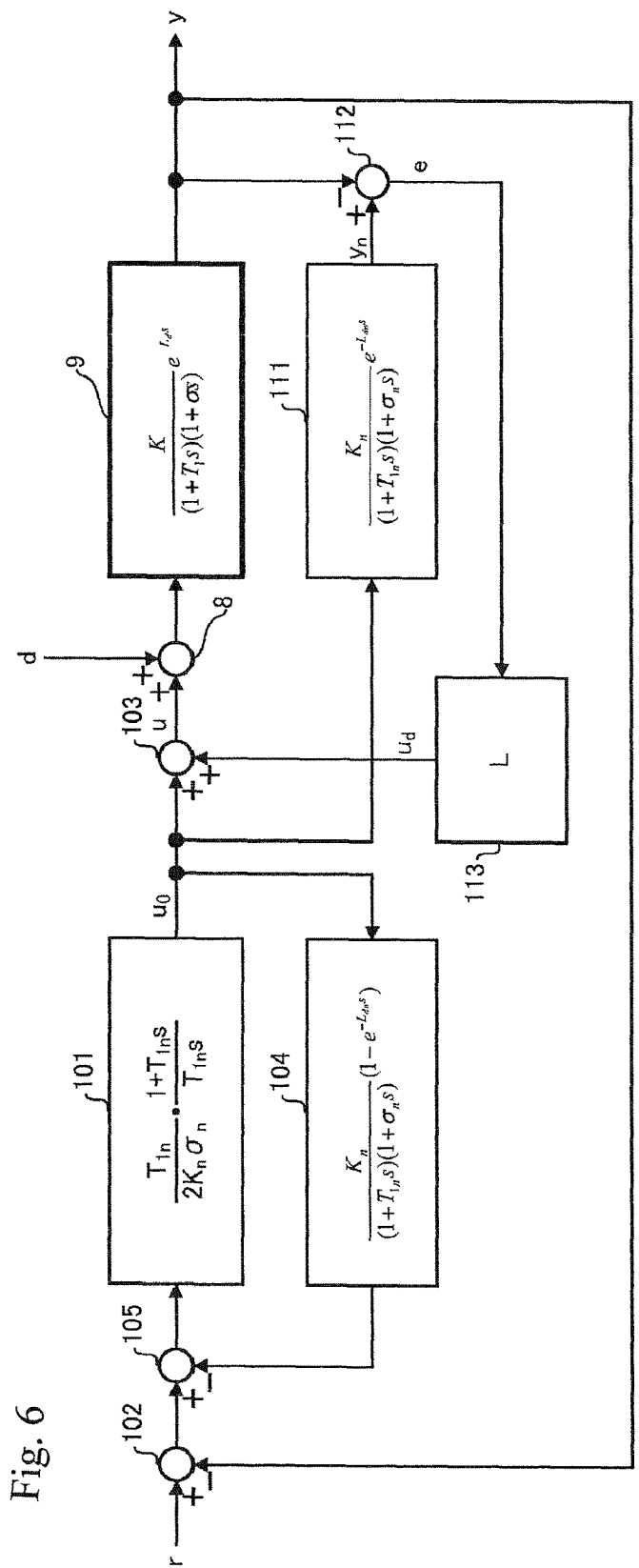
FIG. 6 is a block diagram showing a configuration of a feedback control system including a disturbance feedback including a second order and time delay nominal plant according to the design method of control device in the first embodiment of the invention.

FIG. 6 shows the configuration of the feedback control system when the nominal plant 111 is a second order and time delay. The transfer function $P_n$ of the nominal plant 111 in this case is described by the following Equation (14).

[Equation 14]

$$P_n = \frac{K_n}{(1 + T_{1n}s)(1 + \sigma_n s)} e^{-L_{dn} s} \quad (14)$$

Herein, $K_n$, $T_{1n}$, $\sigma_n$, and $L_{dn}$ are the gain, time constants, and time delay respectively of the nominal plant 111. Also, the Smith compensator 104 into which the output $u_0$ of the feedback controller 101 is input, is appended to the feedback controller 101, and the difference between the output of the adder 102 and the Smith compensator 104 is input via the adder 105. At this time, the transfer function S of the Smith compensator 104 is expressed from the transfer function $P_n$ of the nominal plant 111 as in the following Equation (15).

[Equation 15]

$$S = \frac{K_n}{(1 + T_{1n}s)(1 + \sigma_n s)}(1 - e^{-L_{dn} s}) \quad (15)$$

Meanwhile, the transfer function K of the feedback controller 101, in the same way as in the case of FIG. 3, is determined as in Equation (9) above, by using the gain $K_n$ and time constants $T_{1n}$, $\sigma_n$ of the nominal plant 111.

Figure 7:
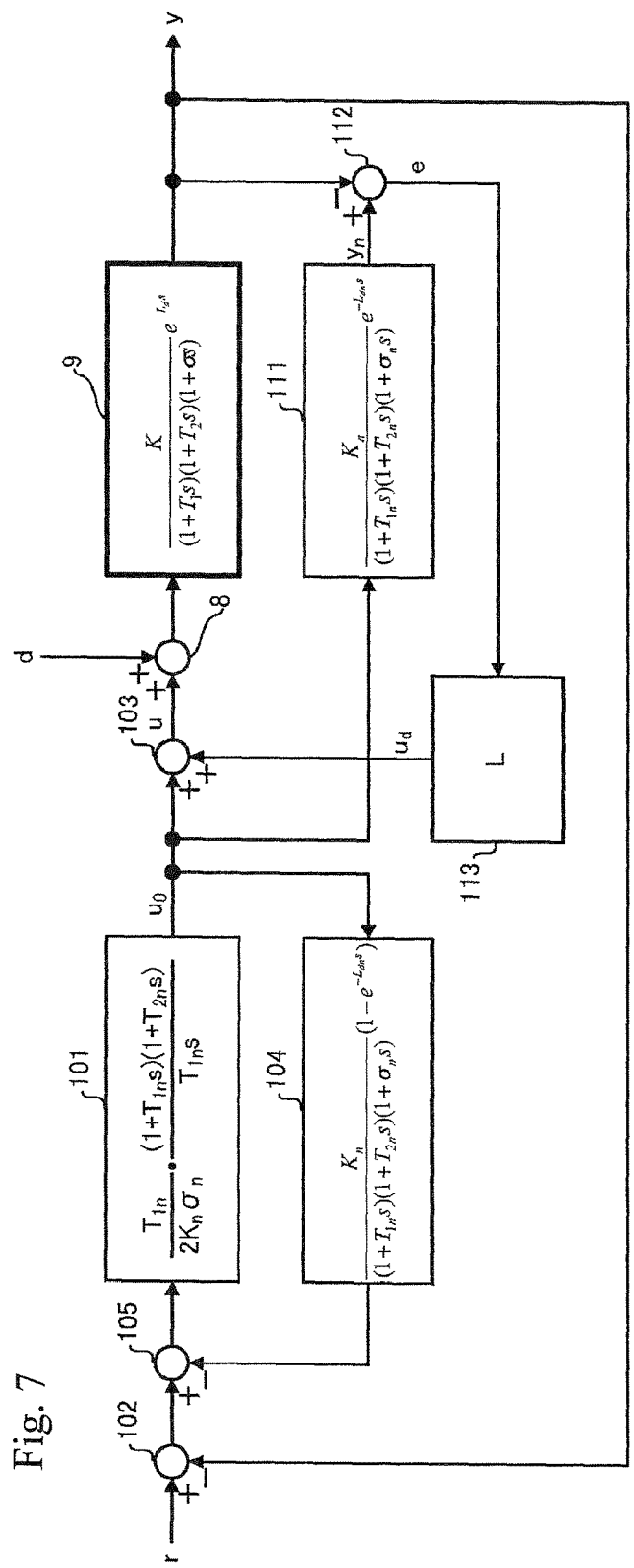
FIG. 7 is a block diagram showing a configuration of a feedback control system including a disturbance feedback including a third order and time delay nominal plant according to the design method of control device in the first embodiment of the invention.

FIG. 7 shows the configuration of the feedback control system when the nominal plant 111 is a third order and time delay. The transfer function $P_n$ of the nominal plant 111 in this case is described by the following Equation (16).

[Equation 16]

$$P_n = \frac{K_n}{(1 + T_{1n}s)(1 + T_{2n}s)(1 + \sigma_n s)} e^{-L_{dn} s} \quad (16)$$

Herein, $K_n$, $T_{1n}$, $T_{2n}$, $\sigma_n$, and $L_{dn}$ are the gain, time constants, and time delay respectively of the nominal plant 111. Also, the Smith compensator 104 into which the output $u_0$ of the feedback controller 101 is input, is appended to the feedback controller 101, and the difference between the output of the adder 102 and the Smith compensator 104 is input via the adder 105. At this time, the transfer function S of the Smith compensator 104 is expressed from the transfer function $P_n$ of the nominal plant 111 as in the following Equation (17).

[Equation 17]

$$S = \frac{K_n}{(1 + T_{1n}s)(1 + T_{2n}s)(1 + \sigma_n s)}(1 - e^{-L_{dn} s}) \quad (17)$$

Meanwhile, the transfer function K of the feedback controller 101, in the same way as in the case of FIG. 4, is determined as in Equation (11) above, by using the gain $K_n$ and time constants $T_{1n}$, $T_{2n}$, $\sigma_n$ of the nominal plant 111.

In this way, the transfer function $P_n$ of the nominal plant 111 and the transfer function K of the feedback controller 101 are determined. Because of this, from Equation (4), it is possible to design the control device of feedback control system 1 with only the feedback gain L as a tuning parameter.

As heretofore described, in the design method of control device of this embodiment, the engineer, firstly, selects the transfer function with the highest conformity rate FIT (whose characteristics are the most similar), from the first order, second order, third order, first order and time delay, second order and time delay, and third order and time delay transfer functions, as the transfer function $P_n$ of the nominal plant 111 in the feedback control system including the disturbance feedback 110 shown in FIG. 1. Also, the engineer determines the transfer function K of the feedback controller 101 based on the parameters (gain and time constants) of the nominal plant 111.

At this time, it is possible to identify the transfer function $P_n$ of the nominal plant 111 from experiment or simulation data, by depending on a least squares method, a prediction error method, or the like, and possible to determine the transfer function K of the feedback controller 101 from the parameters of the transfer function $P_n$. Consequently, the engineer can design the control device of feedback control system 1 with only the feedback gain L as a tuning parameter.

Equivalent Conversion to Two Degrees of Freedom Control System

It is possible to change equivalently from the feedback control system including disturbance feedback shown in FIG. 2 to FIG. 7 to various types of two degrees of freedom control system, such as a feedforward type or loop type (for example, refer to NPL 2).

FIG. 8 to FIG. 13 show configurations wherein the feedback control systems shown in FIG. 2 to FIG. 7 respectively are equivalently converted to a feedforward type two degrees of freedom control system.

Figure 8:
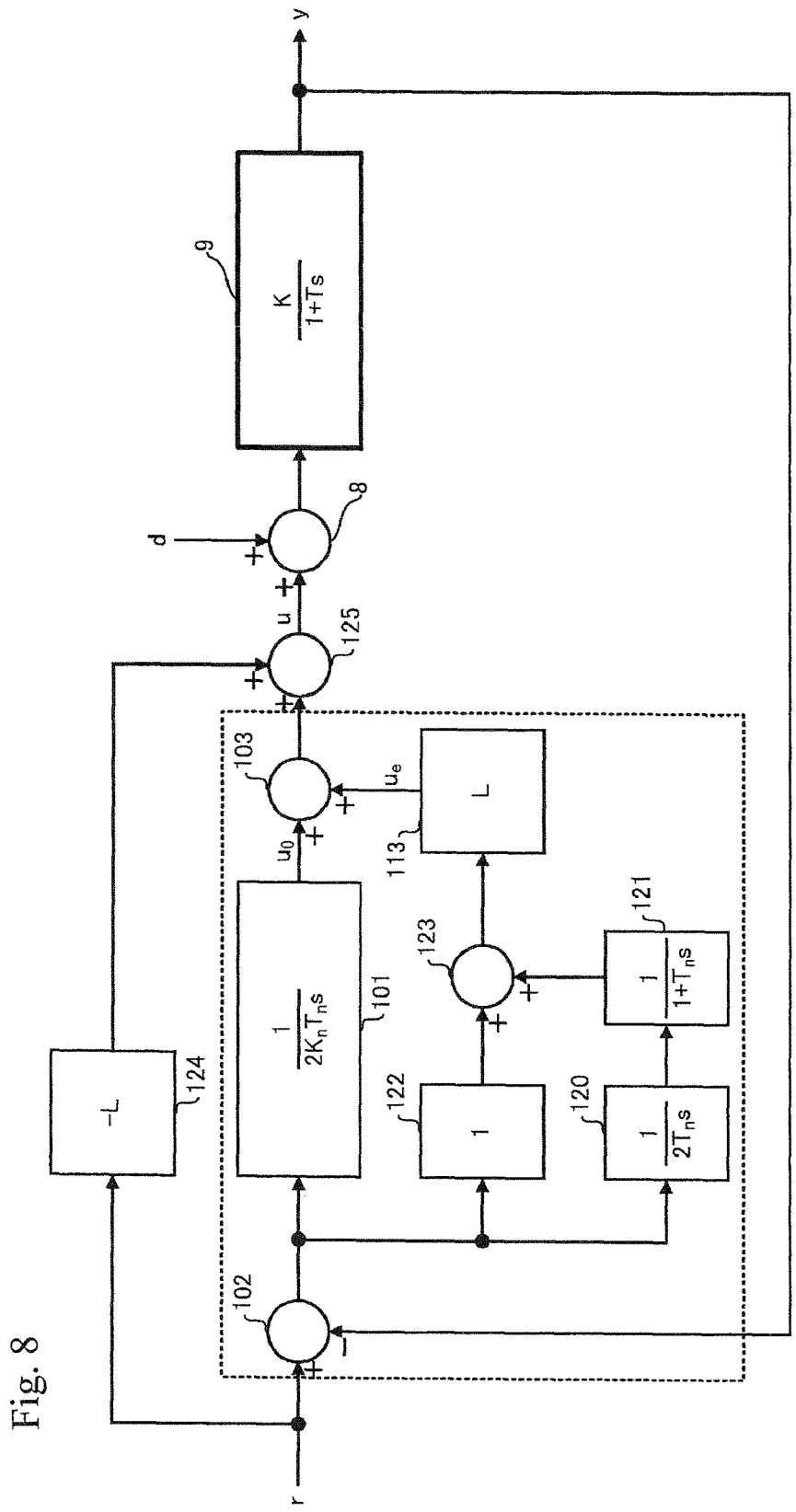
FIG. 8 is a block diagram showing a configuration wherein the feedback control system including a disturbance feedback shown in FIG. 2 is equivalently converted to a feedforward type two degrees of freedom control system.
Figure 9:
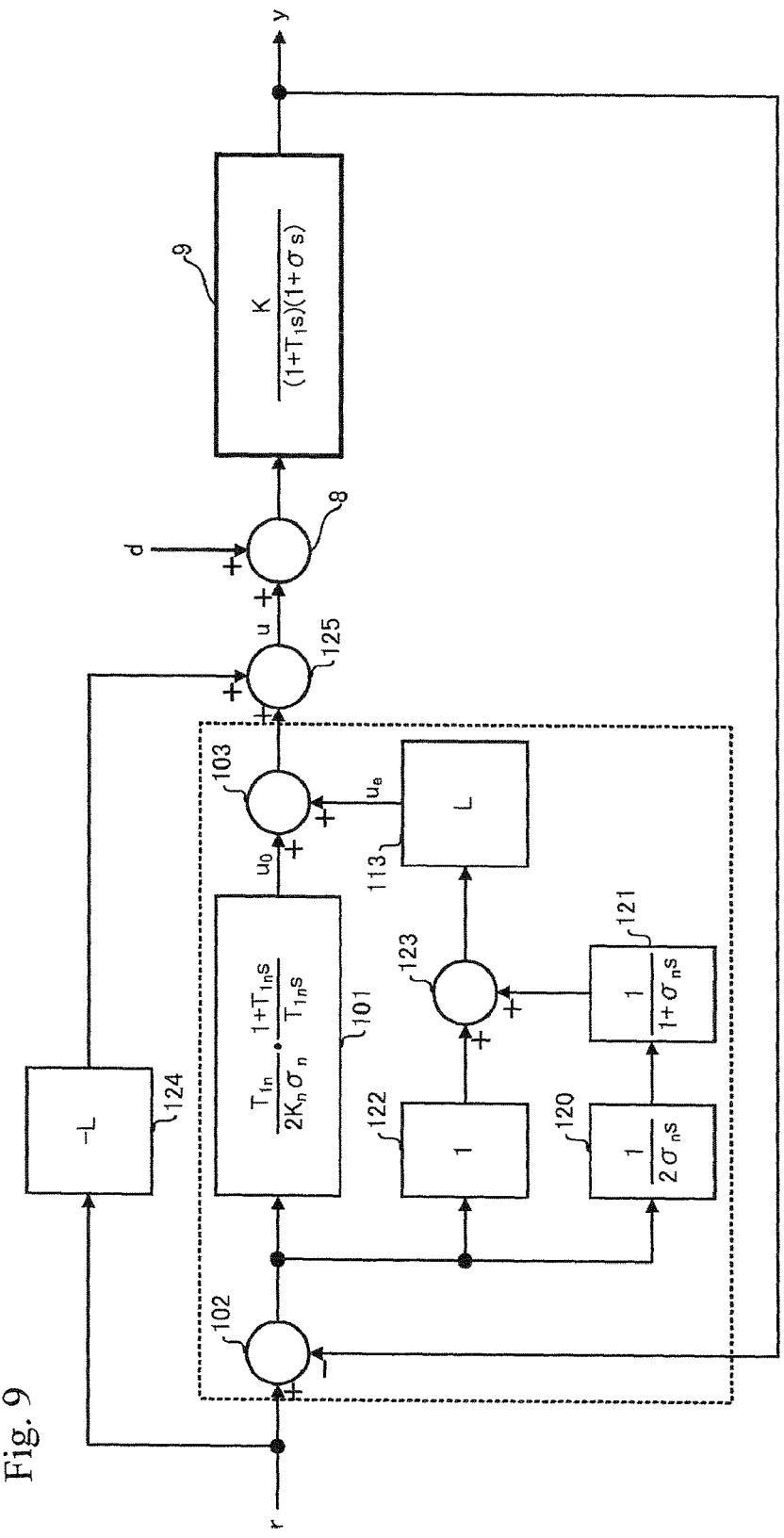
FIG. 9 is a block diagram showing a configuration wherein the feedback control system including a disturbance feedback shown in FIG. 3 is equivalently converted to a feedforward type two degrees of freedom control system.
Figure 10:
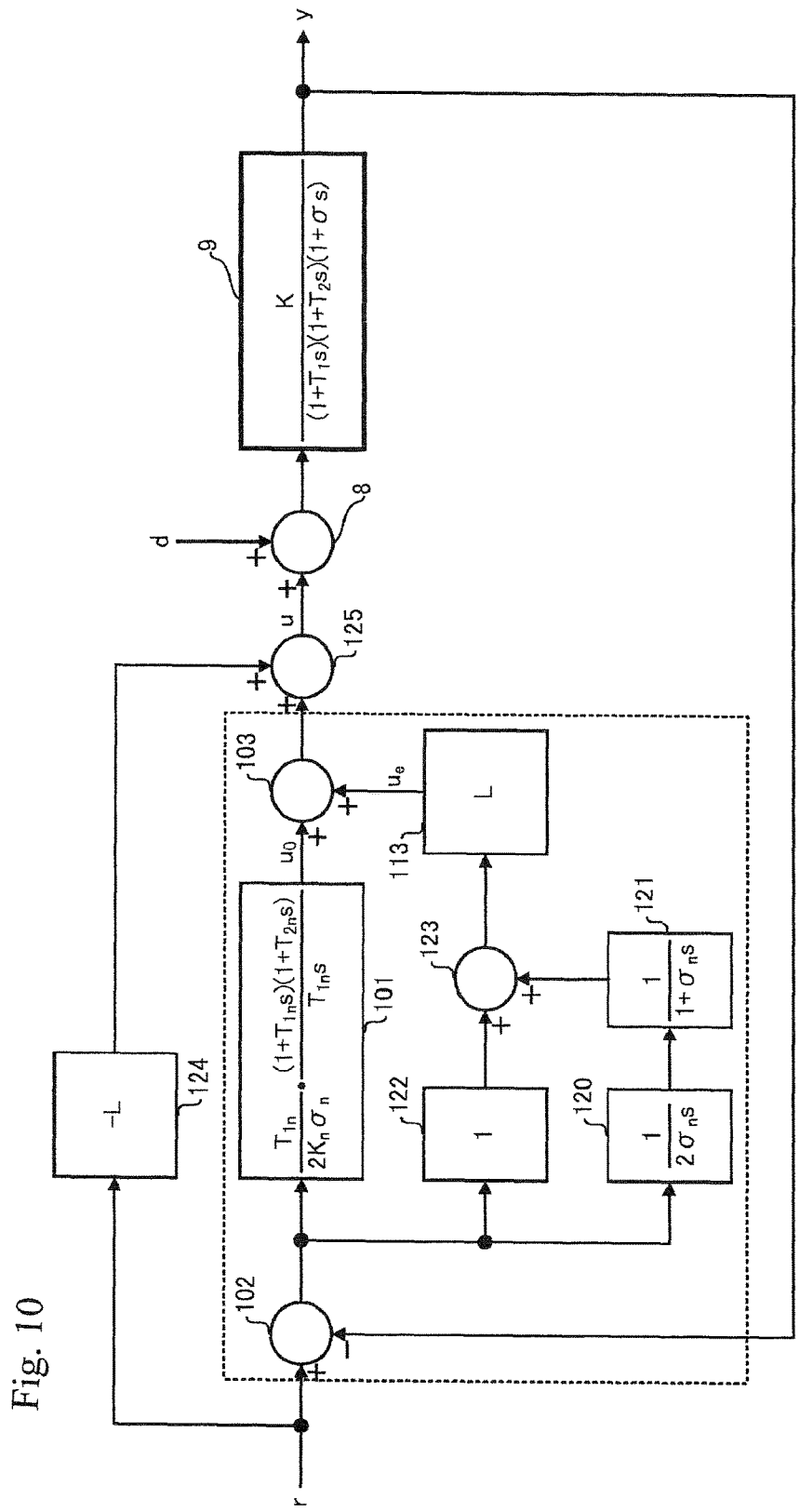
FIG. 10 is a block diagram showing a configuration wherein the feedback control system including a disturbance feedback shown in FIG. 4 is equivalently converted to a feedforward type two degrees of freedom control system.
Figure 11:
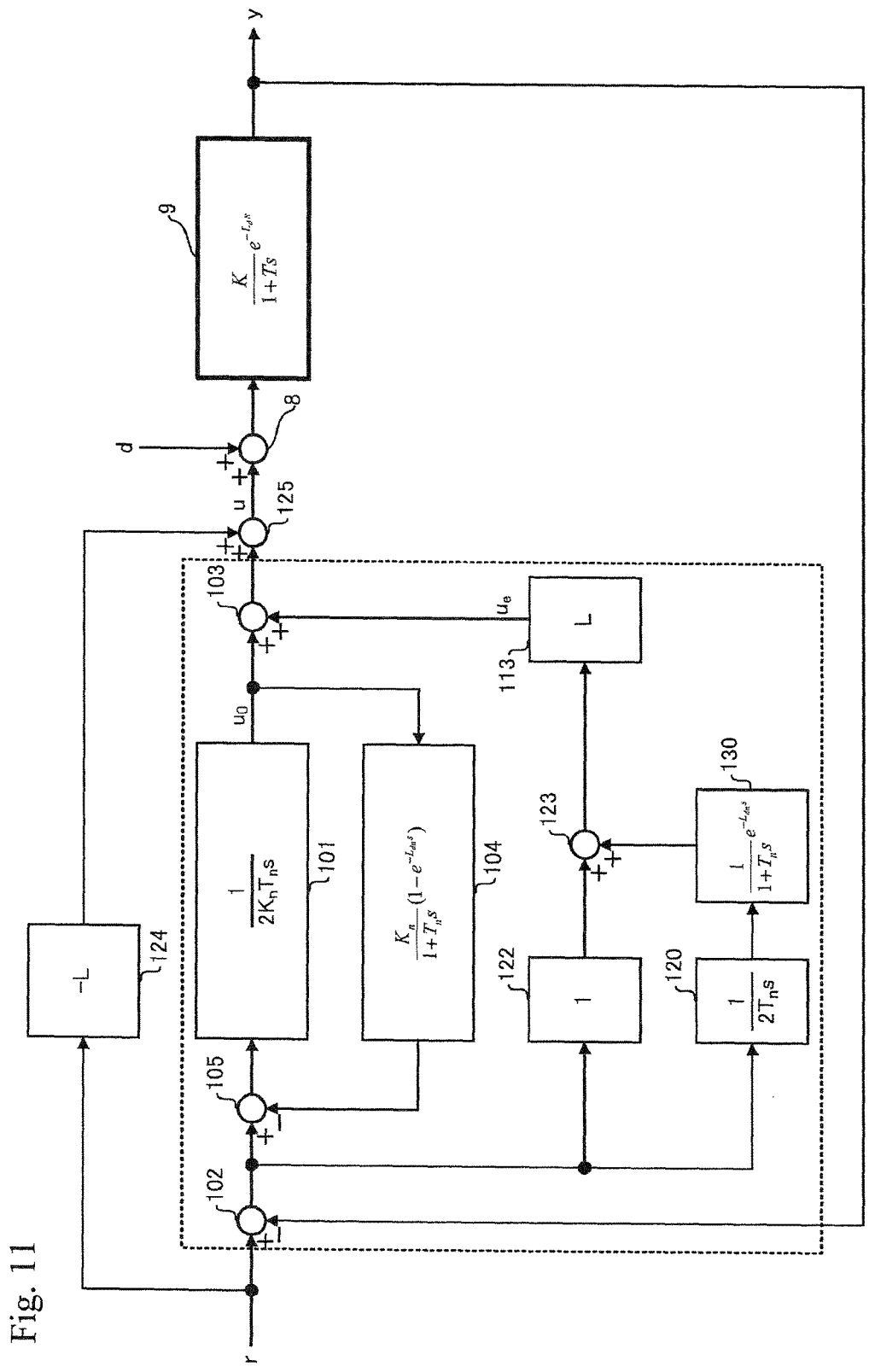
FIG. 11 is a block diagram showing a configuration wherein the feedback control system including a disturbance feedback shown in FIG. 5 is equivalently converted to a feedforward type two degrees of freedom control system.
Figure 12:
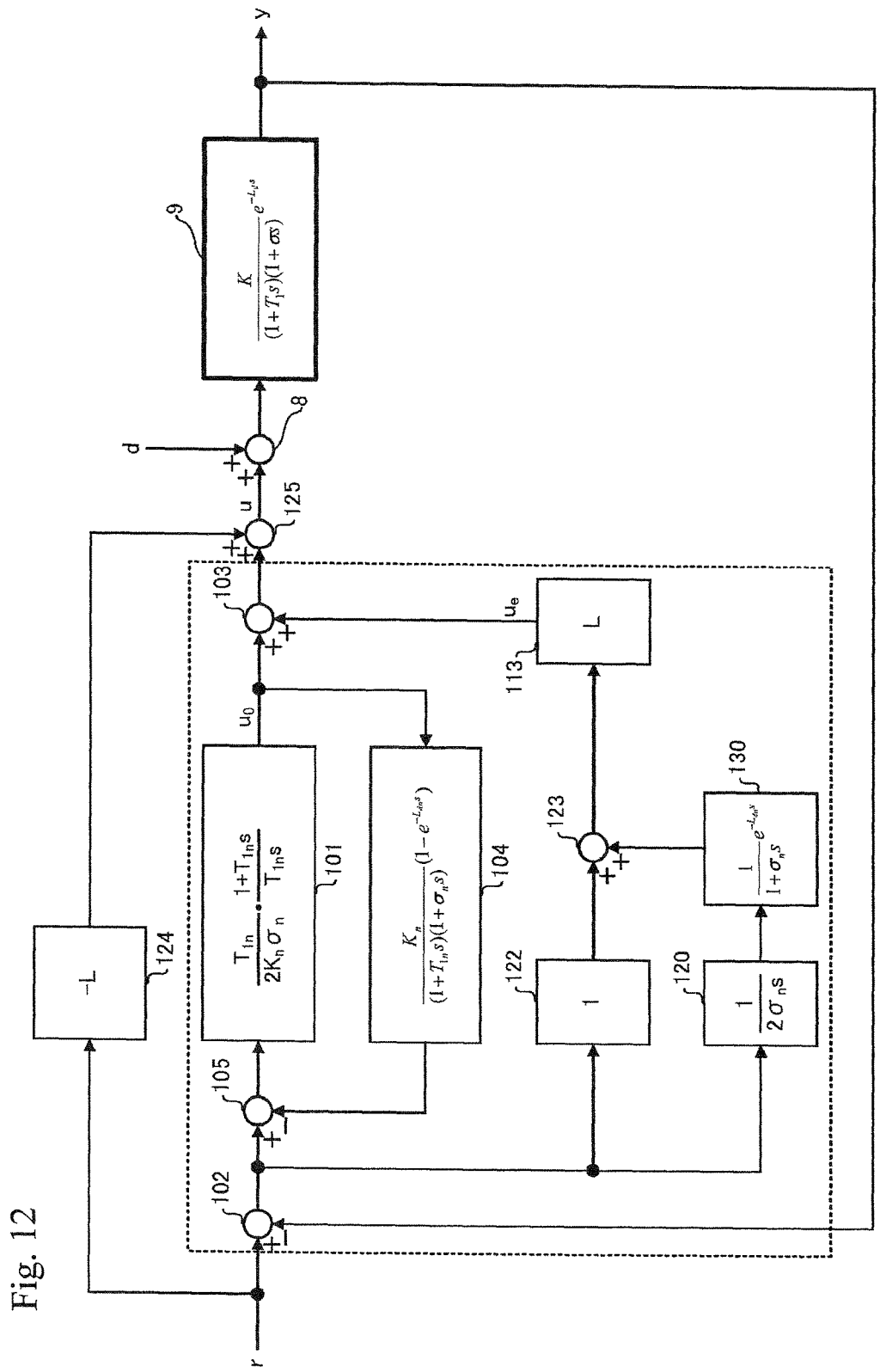
FIG. 12 is a block diagram showing a configuration wherein the feedback control system including a disturbance feedback shown in FIG. 6 is equivalently converted to a feedforward type two degrees of freedom control system.
Figure 13:
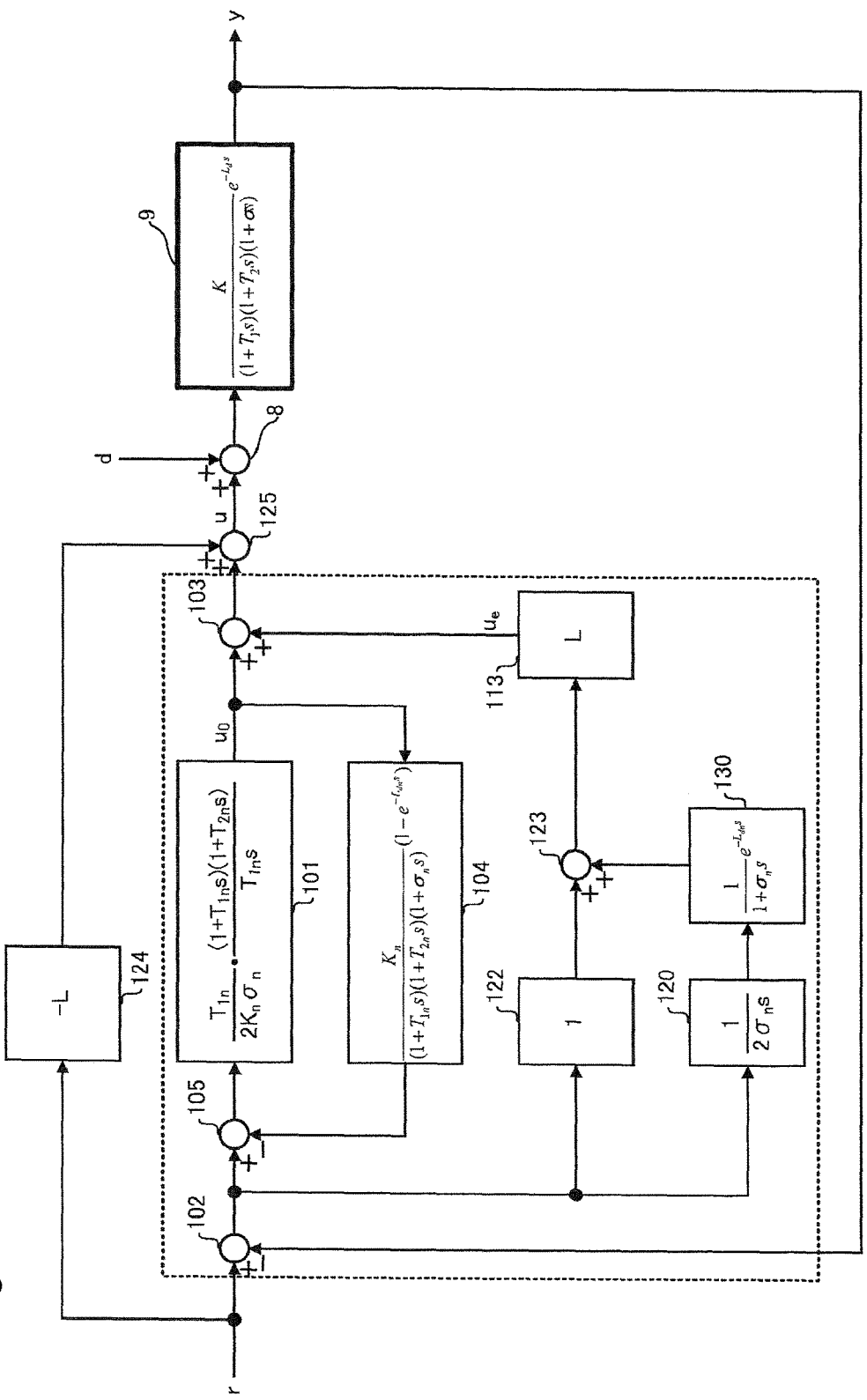
FIG. 13 is a block diagram showing a configuration wherein the feedback control system including a disturbance feedback shown in FIG. 7 is equivalently converted to a feedforward type two degrees of freedom control system.

In FIG. 8 to FIG. 10, the feedback controller 101, adders 102, 103, and 123, the feedback gain 113, and compensating elements 120 to 122 enclosed by broken lines correspond to a configuration such that an output that a proportional device (the compensating element 122) is added to the product of an integrator (the compensating element 120) and a first order transfer function (the compensating element 121) and then multiplied by L, is added to the output of a general (one-degree-of freedom) PID control system (the output $u_o$ of the feedback controller 101). Furthermore, a feedforward path formed of a (feedforward) compensating element 124 and adder 125, entering directly from the set point r to the manipulated variable u, is added to the configuration of the feedforward type two degree of freedom control system. Also, in FIG. 11 to FIG. 13, the Smith compensator 104 and adder 105 are added to the configurations of FIG. 8 to FIG. 10 respectively, and a first order and time delay transfer function (compensating element 130) is used in place of the first order transfer function (compensating element 121).

Herein, the product of the compensating element 120 and compensating element 121 (130) in FIG. 8 to FIG. 13 is equivalent to the product of the transfer function $P_n$ of the nominal plant 111 and transfer function K of the feedback controller 101 in FIG. 2 to FIG. 7 respectively. Consequently, taking the output of the feedback gain 113 to be $u_c$, the manipulated variable u in the feedforward type two degrees of freedom control systems is

[Equation 18]

$$\begin{aligned}u &= u_0 + u_e + (-Lr) \\ &= K(r-y) + L(1 + P_n K)(r-y) - Lr \\ &= (L + K + LP_n K)(r-y) - Lr \\ &= (K + LP_n K)r - (L + K + LP_n K)y\end{aligned} \quad (18)$$

corresponding to the manipulated variable u in the feedback control system including disturbance feedback shown in Equation (4).

Figure 14:
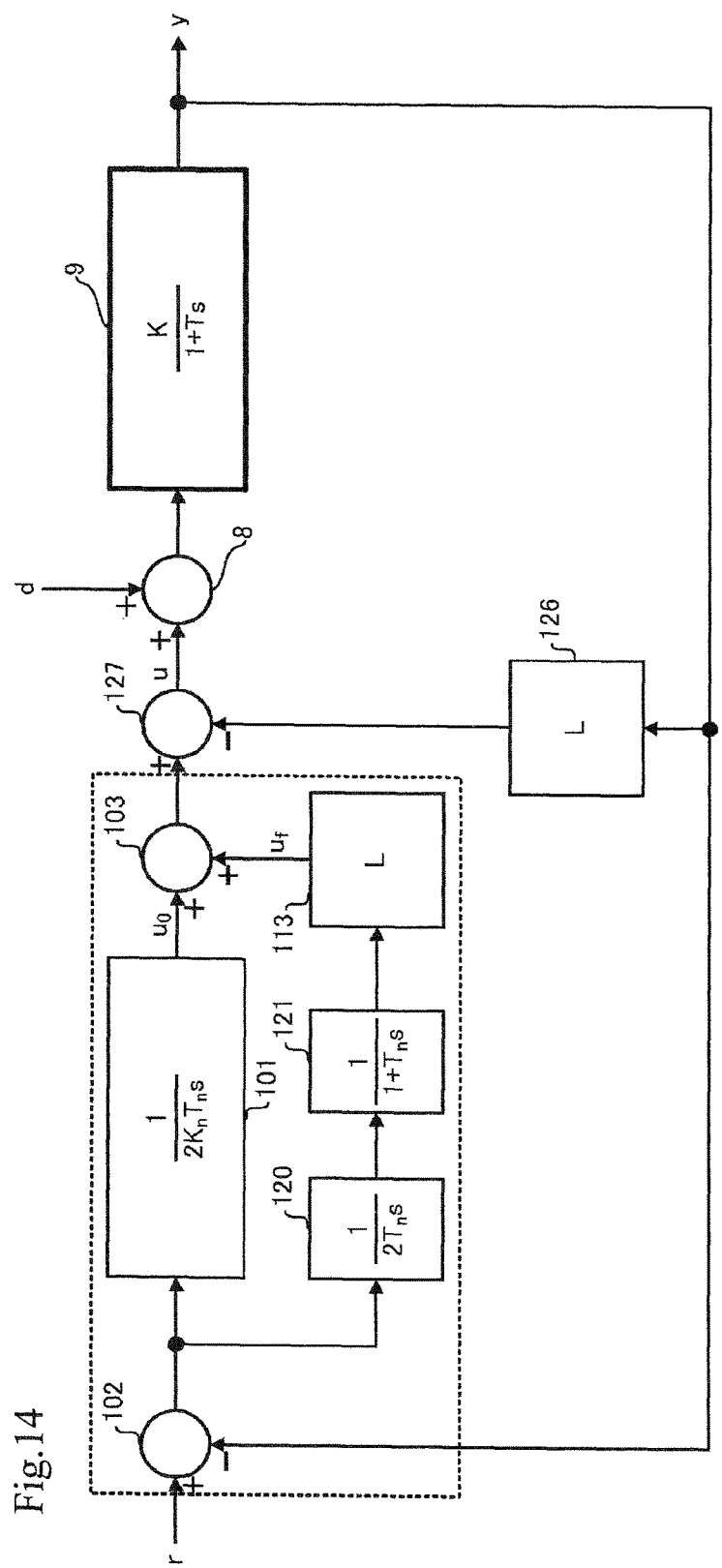
FIG. 14 is a block diagram showing a configuration wherein the feedback control system including a disturbance feedback shown in FIG. 2 is equivalently converted to a feedback type two degrees of freedom control system.
Figure 15:
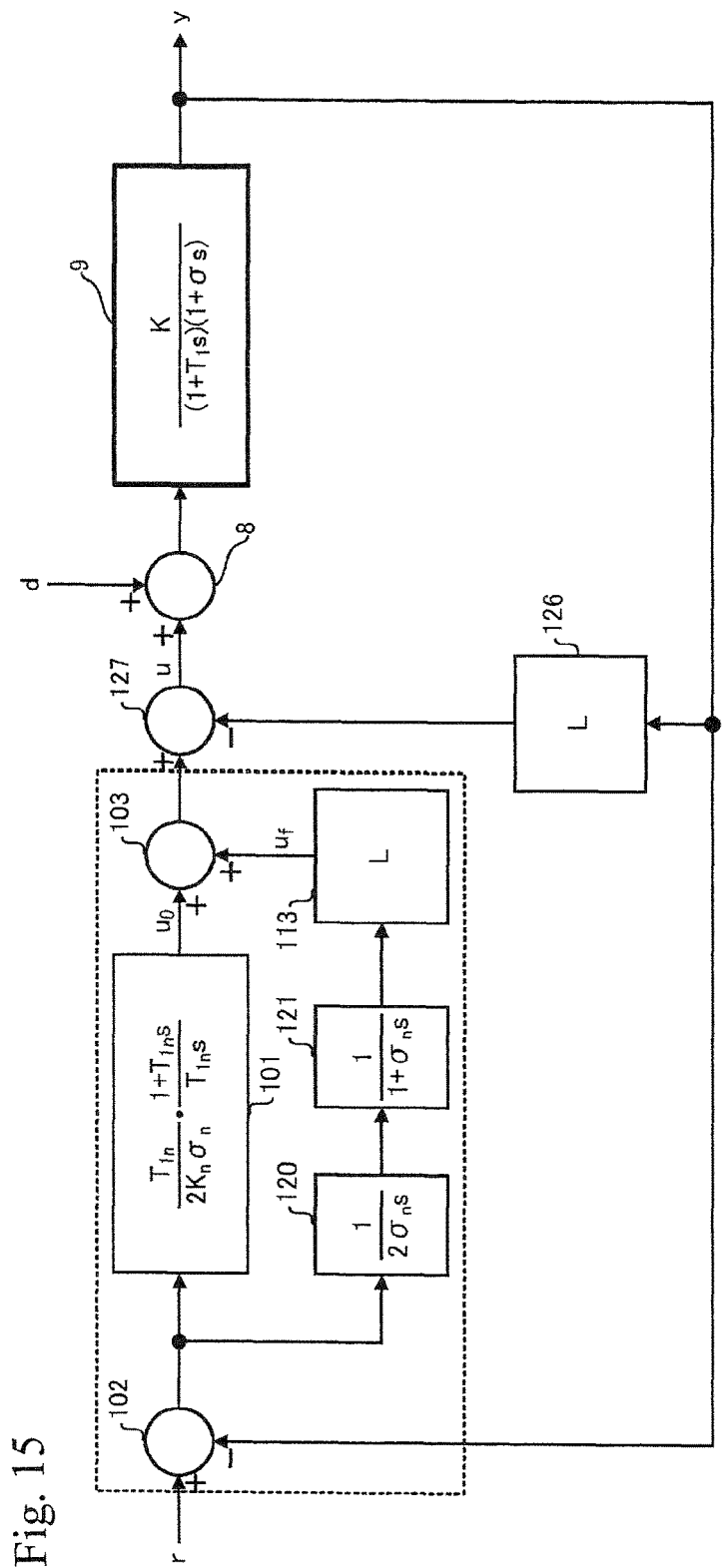
FIG. 15 is a block diagram showing a configuration wherein the feedback control system including a disturbance feedback shown in FIG. 3 is equivalently converted to a feedback type two degrees of freedom control system.
Figure 16:
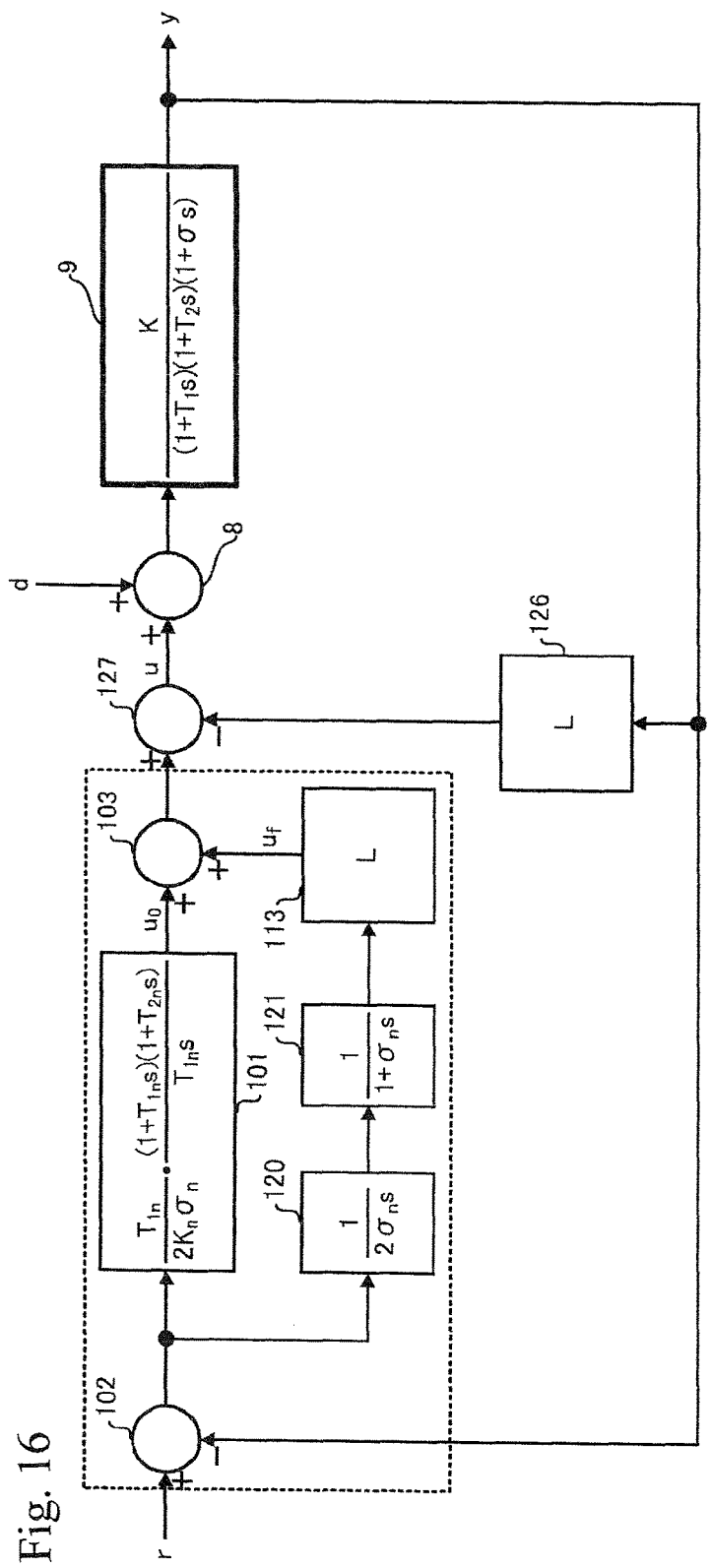
FIG. 16 is a block diagram showing a configuration wherein the feedback control system including a disturbance feedback shown in FIG. 4 is equivalently converted to a feedback type two degrees of freedom control system.
Figure 17:
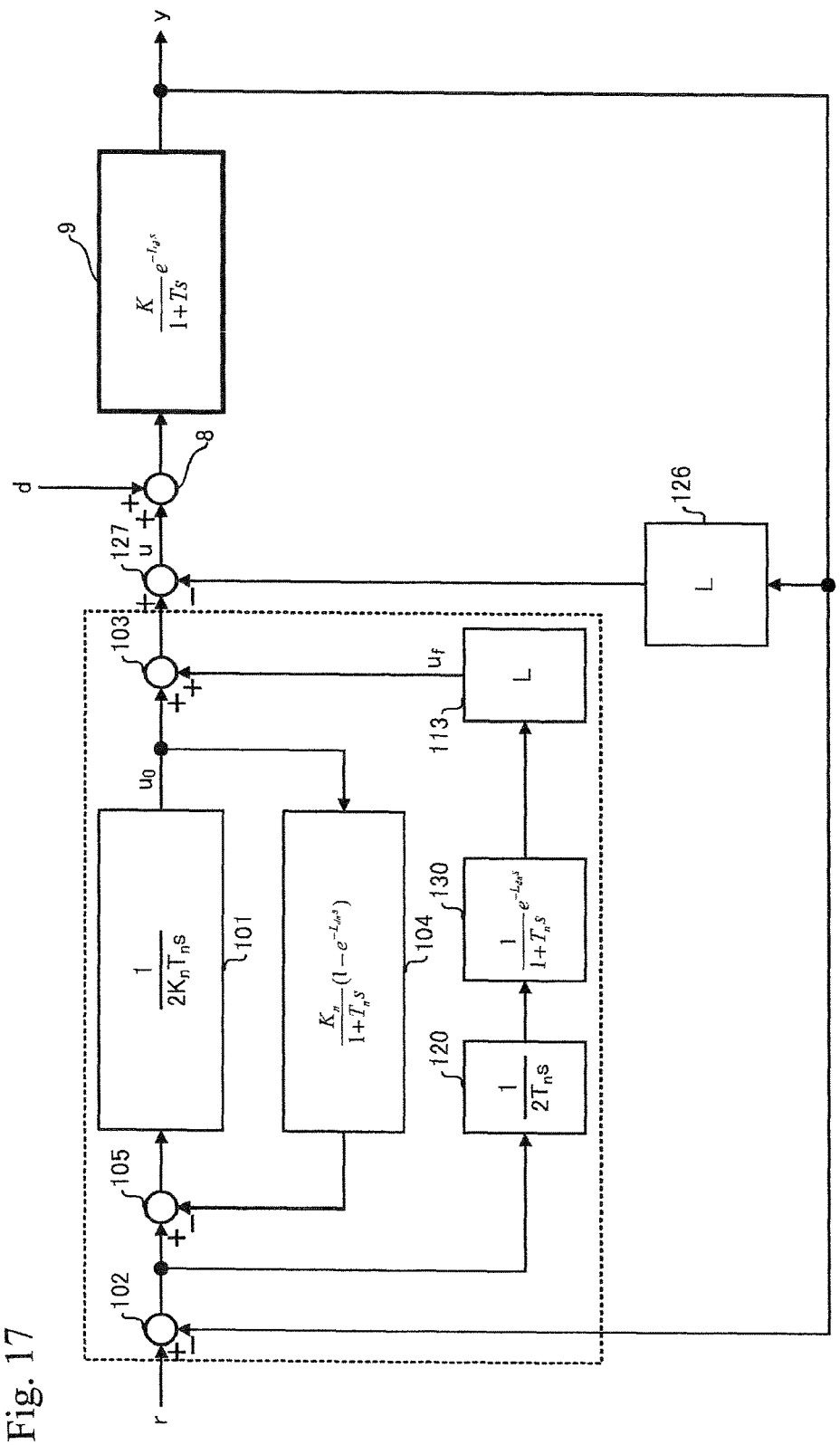
FIG. 17 is a block diagram showing a configuration wherein the feedback control system including a disturbance feedback shown in FIG. 5 is equivalently converted to a feedback type two degrees of freedom control system.
Figure 18:
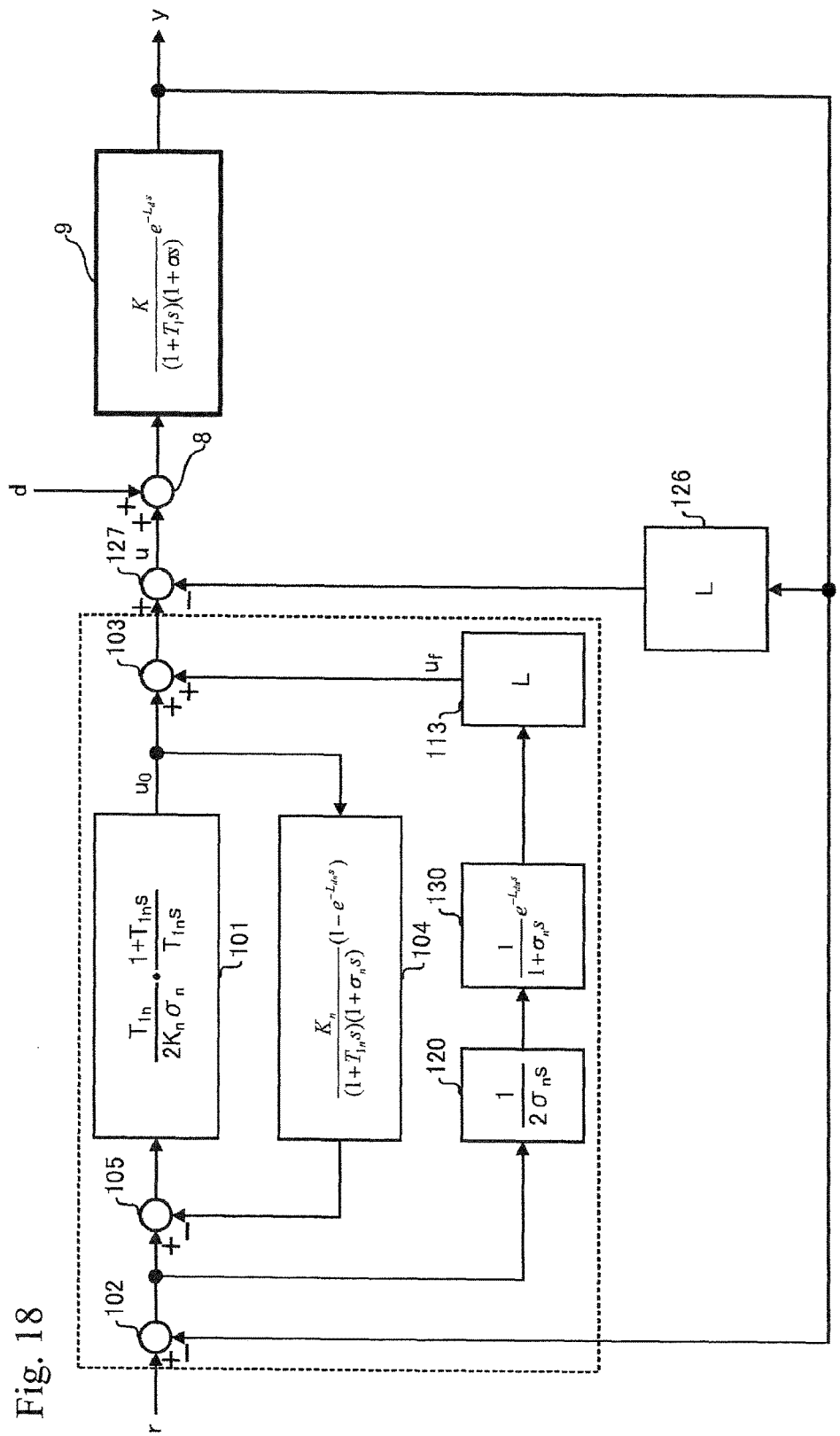
FIG. 18 is a block diagram showing a configuration wherein the feedback control system including a disturbance feedback shown in FIG. 6 is equivalently converted to a feedback type two degrees of freedom control system.
Figure 19:
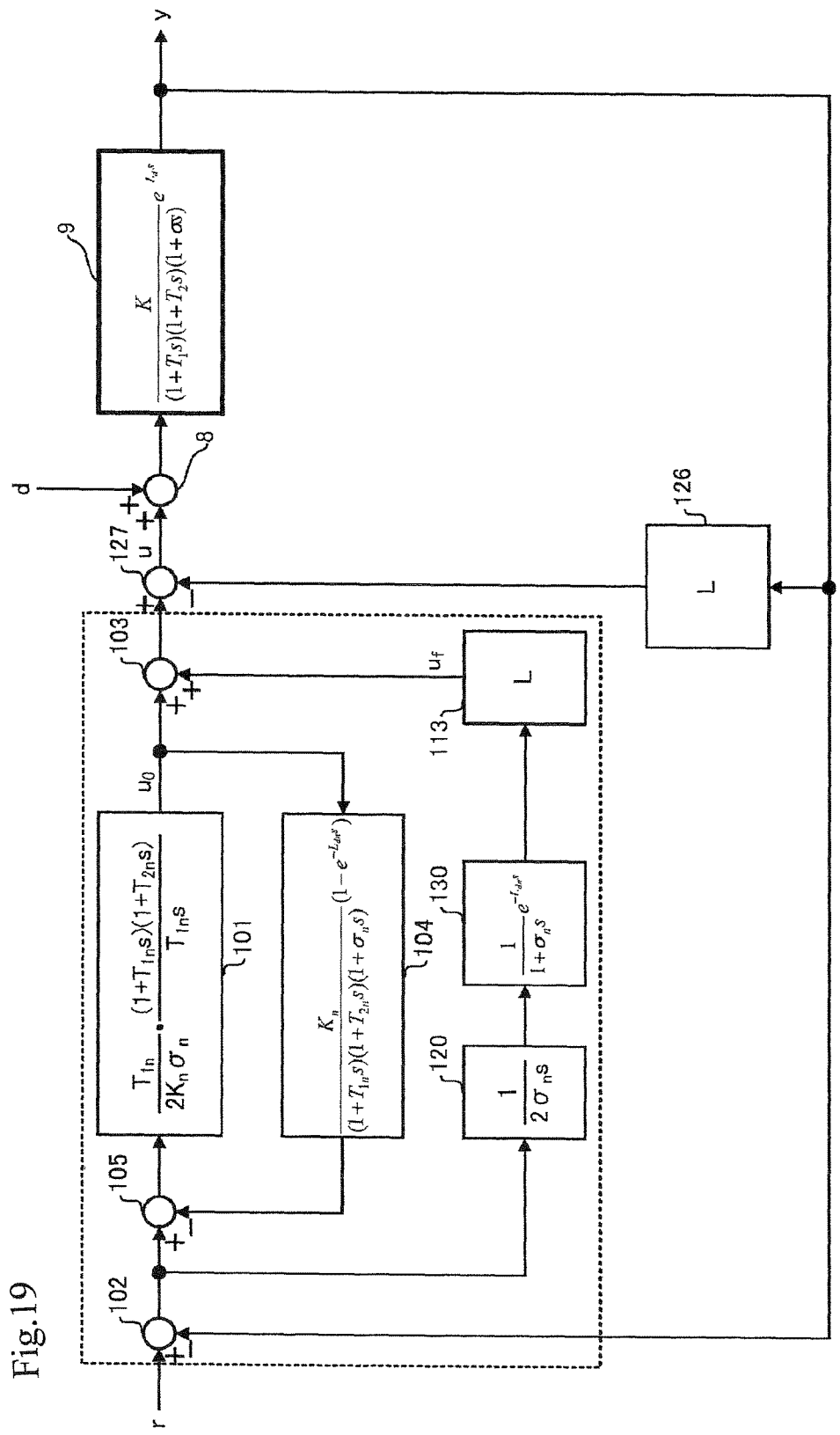
FIG. 19 is a block diagram showing a configuration wherein the feedback control system including a disturbance feedback shown in FIG. 7 is equivalently converted to a feedback type two degrees of freedom control system.

FIG. 14 to FIG. 19 show configurations wherein the feedback control systems shown in FIG. 2 to FIG. 7 respectively are equivalently converted to a feedback type two degrees of freedom control system. In FIG. 14 to FIG. 16, the feedback controller 101, adders 102 and 103, feedback gain 113, and compensating elements 120 and 121 enclosed by broken lines correspond to a configuration such that an output that is the product of an integrator (the compensating element 120) and a first order transfer function (the compensating element 121) multiplied by L, is added to the output of a general (one-degree-of freedom) PID control system (the output $u_o$ of the feedback controller 101). Furthermore, a feedback path formed of a (feedback) compensating element 126 and adder 127, entering directly from the controlled variable y to the manipulated variable u, is added to the configuration of the feedback type two degrees of freedom control system. Also, in FIG. 17 to FIG. 19, the Smith compensator 104 and adder 105 are added to the configurations of FIG. 14 to FIG. 16 respectively, and a first order and time delay transfer function (the compensating element 130) is used in place of the first order transfer function (compensating element 121).

Herein, the product of the compensating element 120 and compensating element 121 (130) in FIG. 14 to FIG. 19 is equivalent to the product of the transfer function $P_n$ of the nominal plant 111 and transfer function K of the feedback controller 101 in FIG. 2 to FIG. 7 respectively. Consequently, taking the output of the feedback gain 113 to be $u_f$, the manipulated variable u in the feedback type two degrees of freedom control systems is

[Equation 19]

$$\begin{aligned}u &= u_0 + u_f - Ly \\ &= K(r-y) + LP_n K(r-y) - Ly \\ &= (K + LP_n K)(r-y) - Ly \\ &= (K + LP_n K)r - (L + K + LP_n K)y\end{aligned} \quad (19)$$

corresponding to the manipulated variable u in the feedback control system including disturbance feedback shown in Equation (4).

Figure 20:
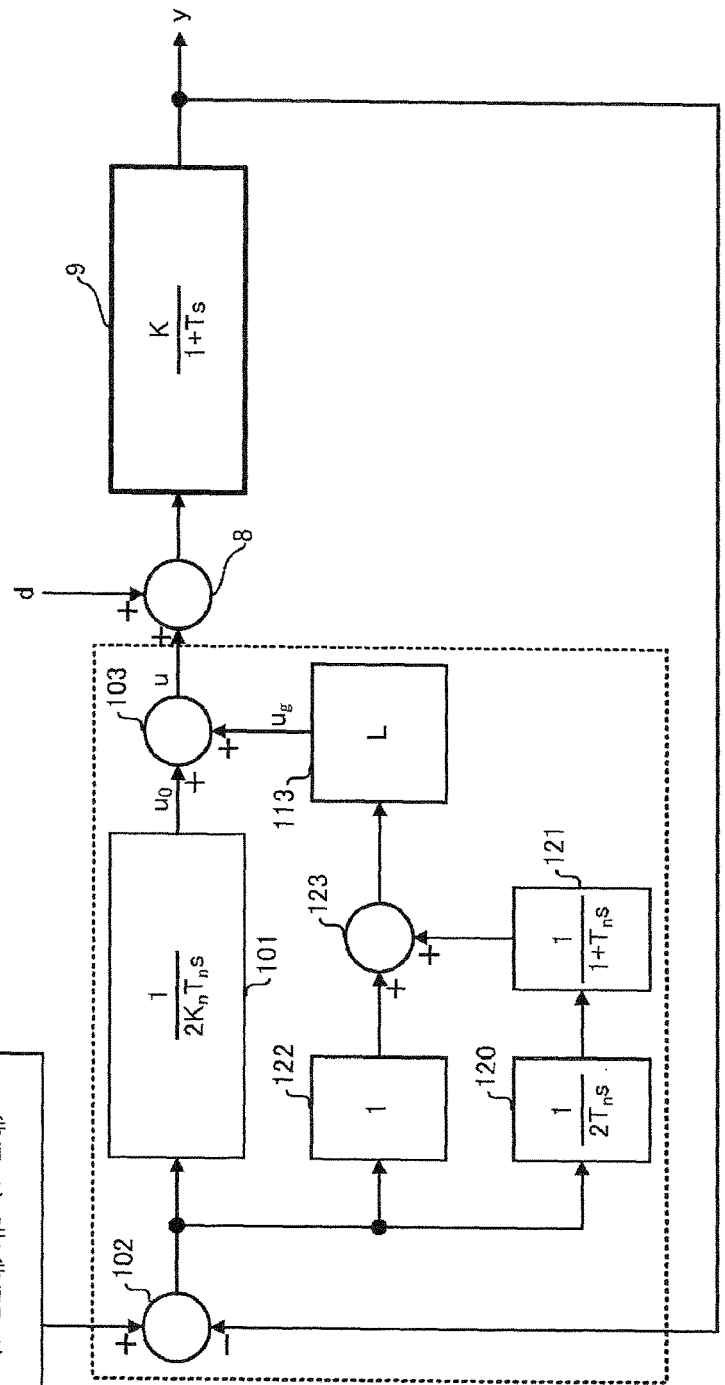
FIG. 20 is a block diagram showing a configuration wherein the feedback control system including a disturbance feedback shown in FIG. 2 is equivalently converted to a filter type two degrees of freedom control system.
Figure 21:
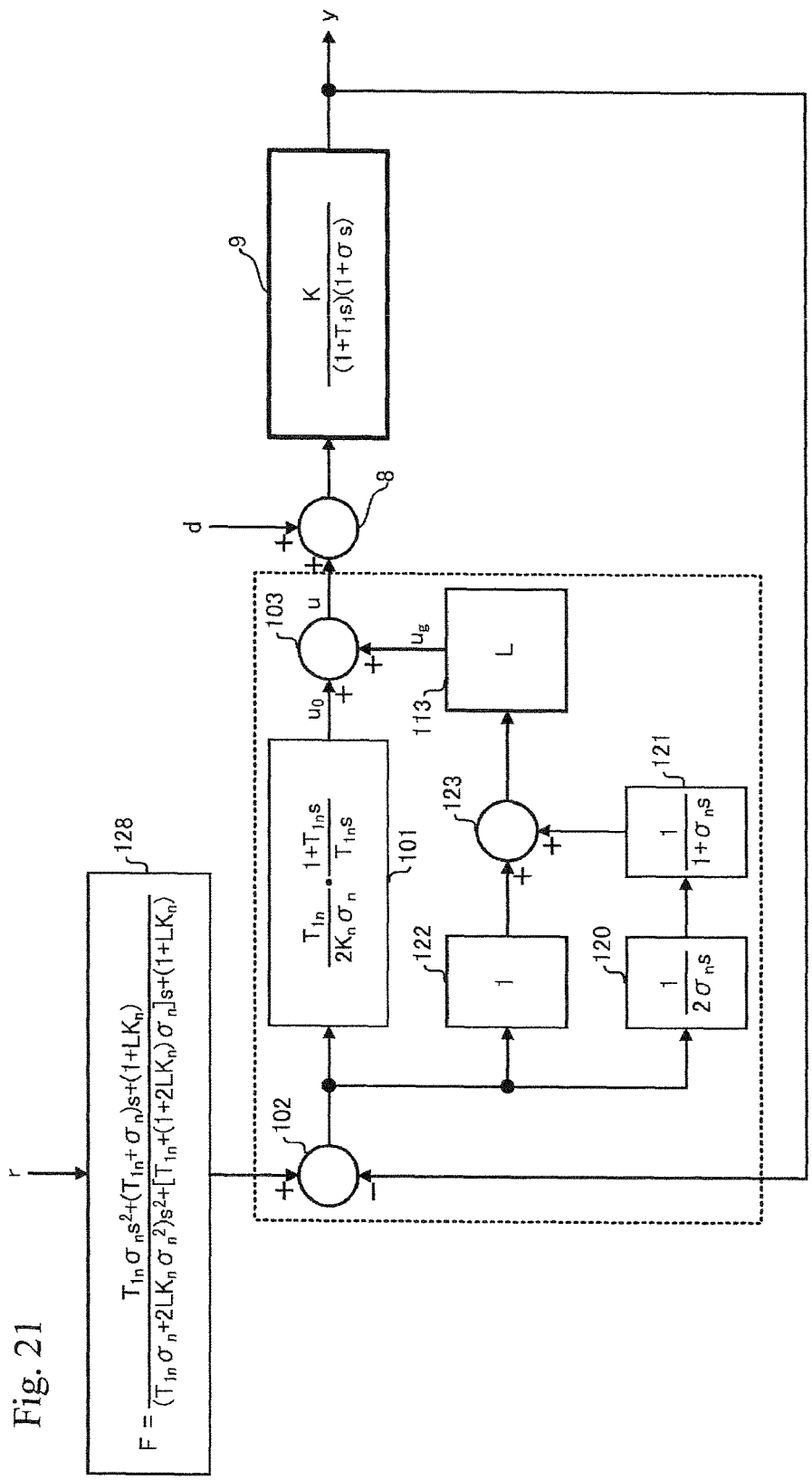
FIG. 21 is a block diagram showing a configuration wherein the feedback control system including a disturbance feedback shown in FIG. 3 is equivalently converted to a filter type two degrees of freedom control system.
Figure 22:
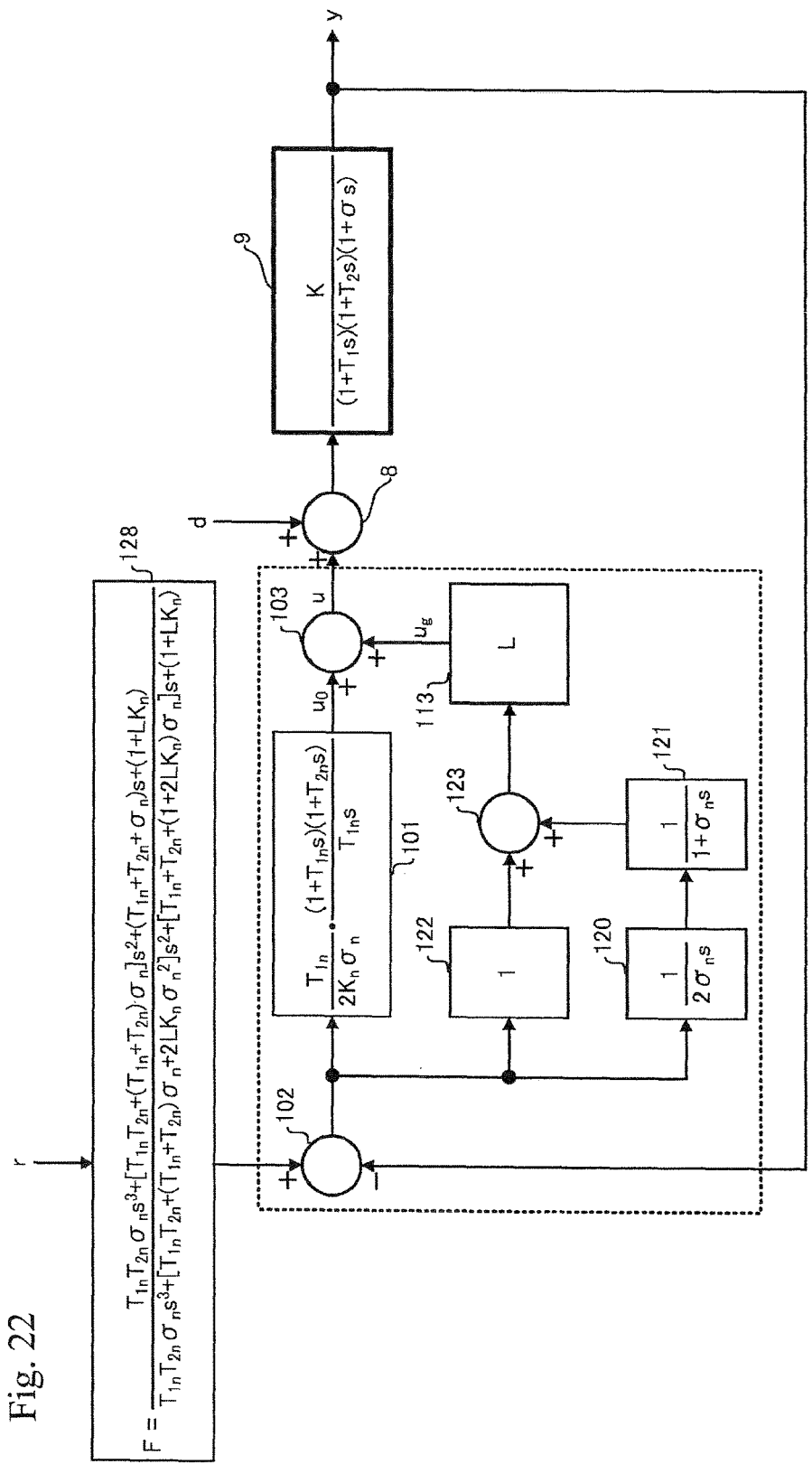
FIG. 22 is a block diagram showing a configuration wherein the feedback control system including a disturbance feedback shown in FIG. 4 is equivalently converted to a filter type two degrees of freedom control system.
Figure 23:
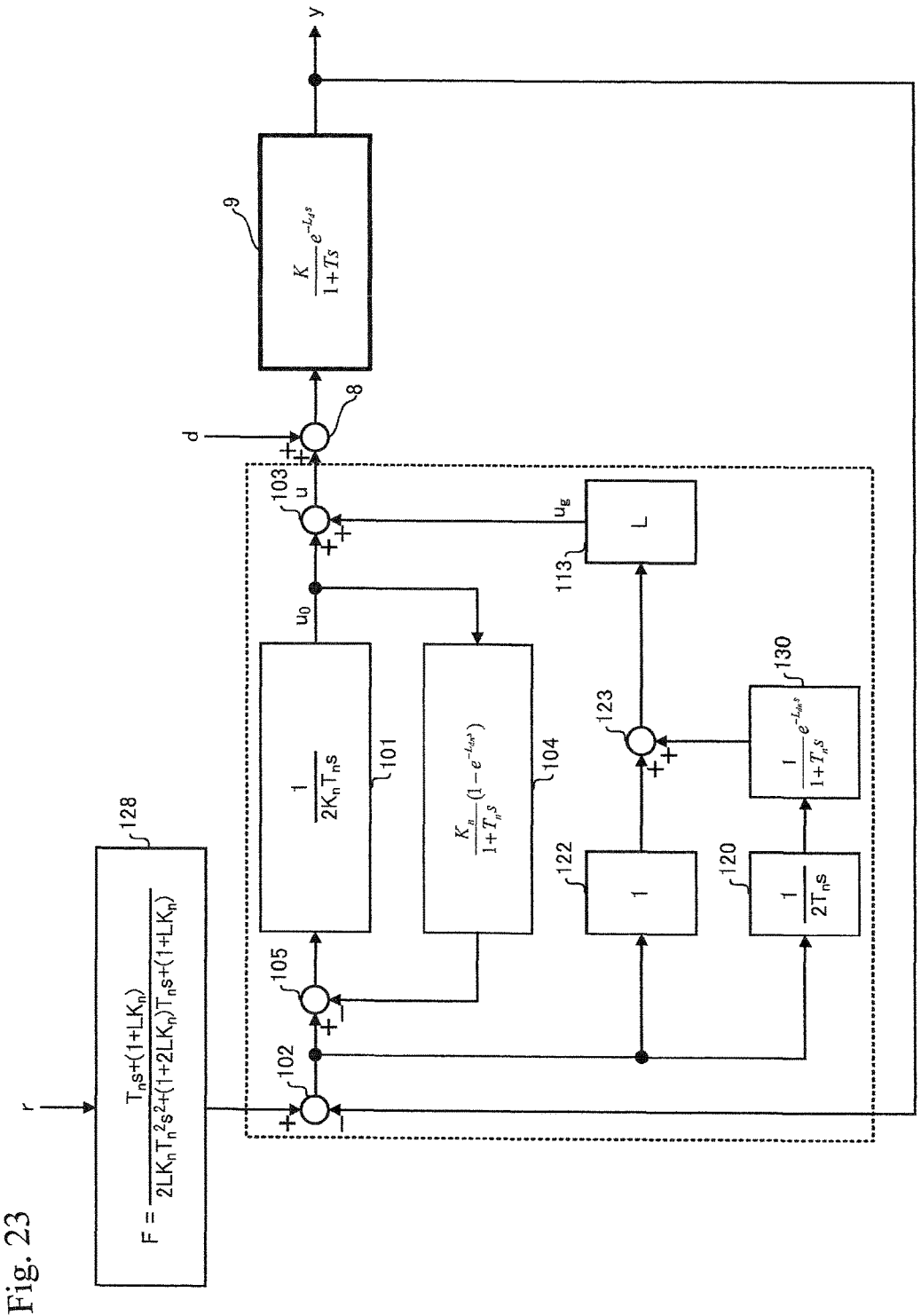
FIG. 23 is a block diagram showing a configuration wherein the feedback control system including a disturbance feedback shown in FIG. 5 is equivalently converted to a filter type two degrees of freedom control system.
Figure 24:
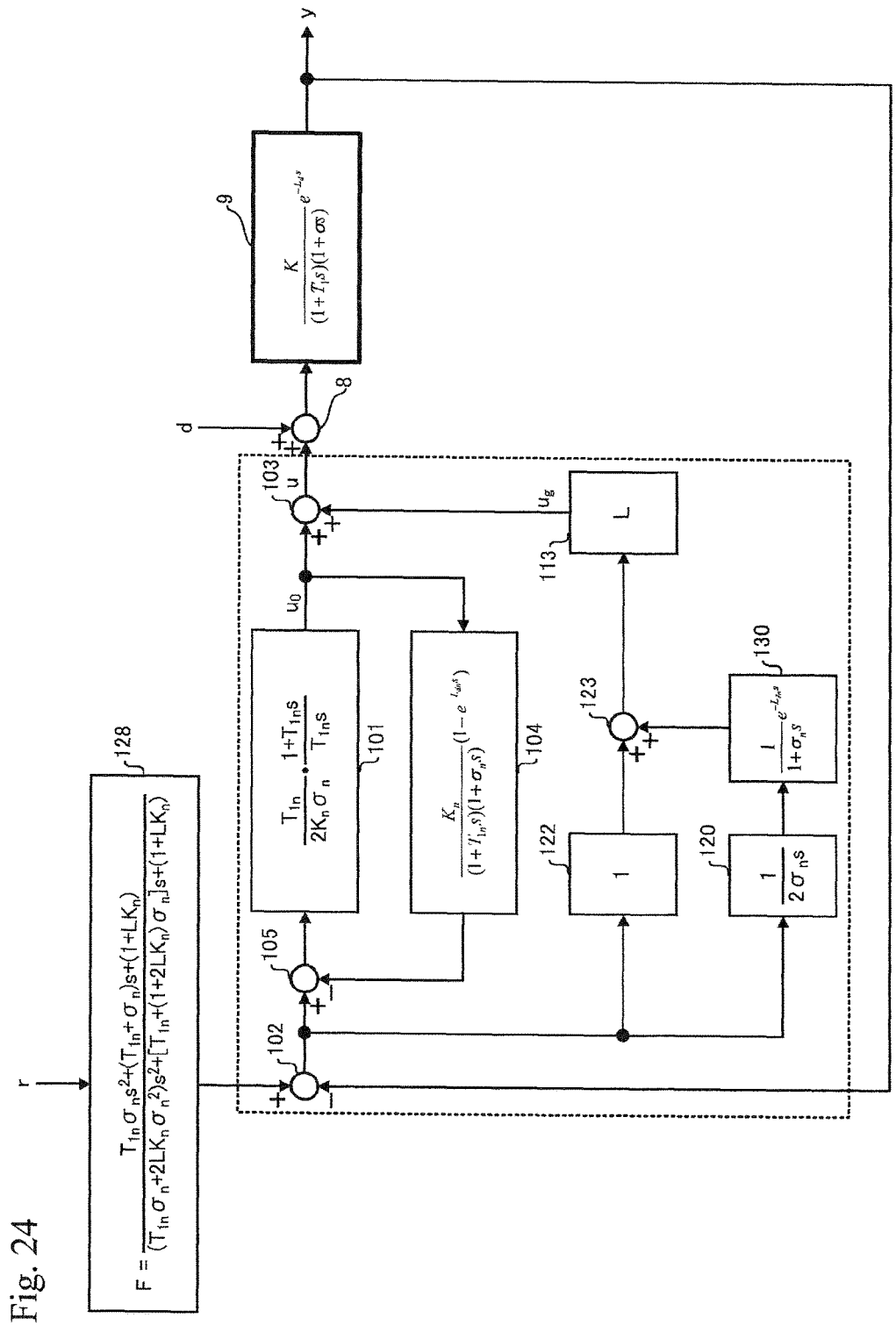
FIG. 24 is a block diagram showing a configuration wherein the feedback control system including a disturbance feedback shown in FIG. 6 is equivalently converted to a filter type two degrees of freedom control system.
Figure 25:
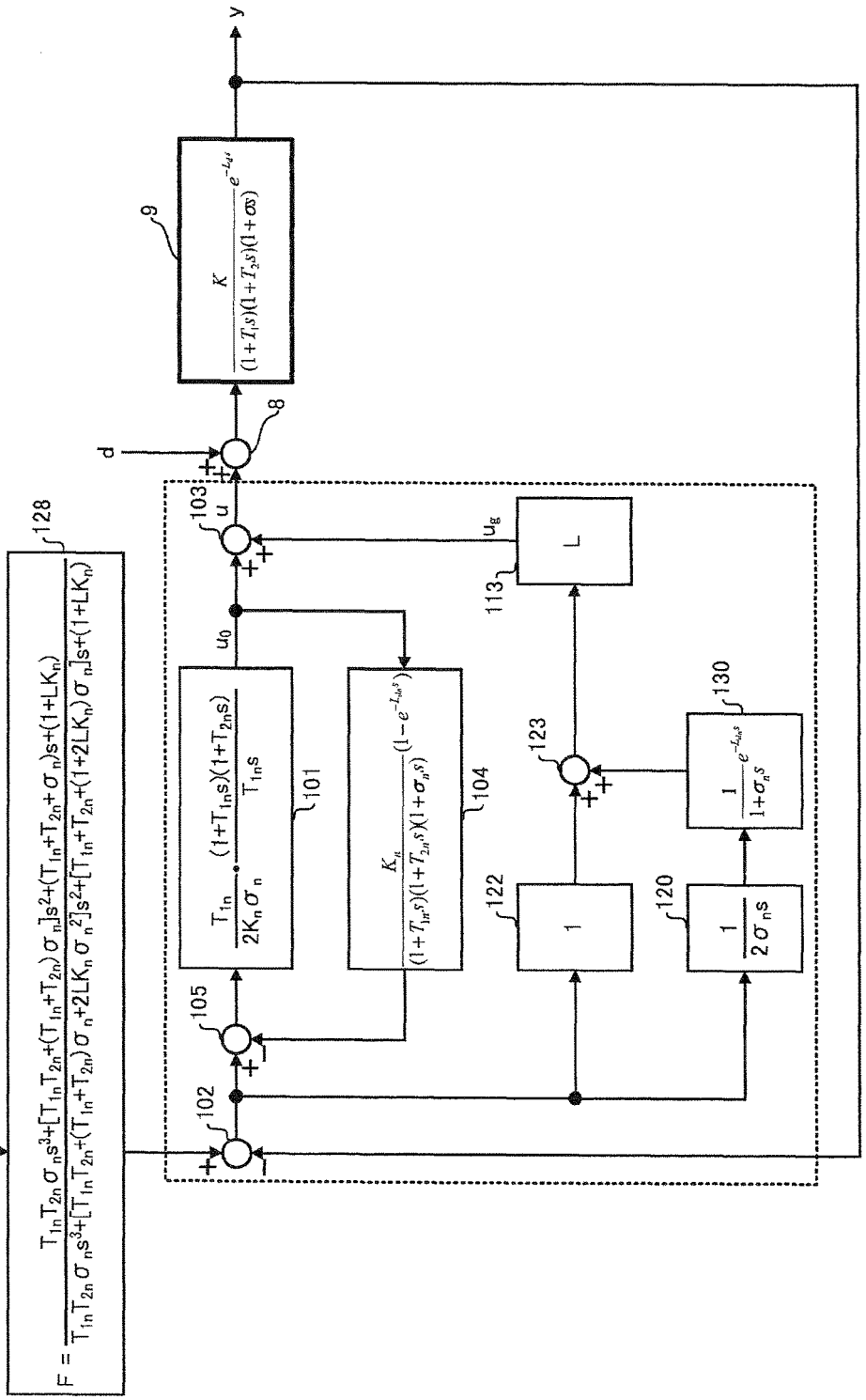
FIG. 25 is a block diagram showing a configuration wherein the feedback control system including a disturbance feedback shown in FIG. 7 is equivalently converted to a filter type two degrees of freedom control system.

FIG. 20 to FIG. 25 show configurations wherein the feedback control systems shown in FIG. 2 to FIG. 7 respectively are equivalently converted to a filter type two degrees of freedom control system. In FIG. 20 to FIG. 22, the feedback controller 101, adders 102, 103, and 123, feedback gain 113, and compensating elements 120 to 122 enclosed by broken lines correspond to a configuration such that an output that is a proportional device (the compensating element 122) added to the product of an integrator (the compensating element 120) and a first order transfer function (the compensating element 121) and then multiplied by L, is added to the output of a general (one-degree-of freedom) PID control system (the output $u_o$) of the feedback controller 101). Furthermore, in the configuration of the filter type two degrees of freedom control system, a (filter) compensating element 128 is added before the input of the set point r into the adder 102. Also, in FIG. 23 to FIG. 25, the Smith compensator 104 and adder 105 are added to the configurations of FIG. 20 to FIG. 22 respectively, and a first order and time delay transfer function (the compensating element 130) is used in place of the first order transfer function (compensating element 121).

Herein, the product of the compensating element 120 and compensating element 121 (130) in FIG. 20 to FIG. 25 is equivalent to the product of the transfer function $P_n$ of the nominal plant 111 and transfer function K of the feedback controller 101 in FIG. 2 to FIG. 7 respectively. Also, a transfer function F of the compensating element 128 is described by the following Equation (20) in each case.

[Equation 20]

$$F = \frac{K + LP_n K}{L + K + LP_n K} \quad (20)$$

Consequently, taking the output of the feedback gain 113 to be $u_g$, the manipulated variable u in the filter type two degrees of freedom control systems is

[Equation 21]

$$\begin{aligned}u &= u_0 + u_g \\ &= K(Fr - y) + L(1 + P_n K)(Fr - y) \\ &= (L + K + LP_n K)\left(\frac{K + LP_n K}{L + K + LP_n K}r - y\right) \\ &= (K + LP_n K)r - (L + K + LP_n K)y\end{aligned} \quad (21)$$

corresponding to the manipulated variable u in the feedback control system including disturbance feedback shown in Equation (4).

Figure 26:
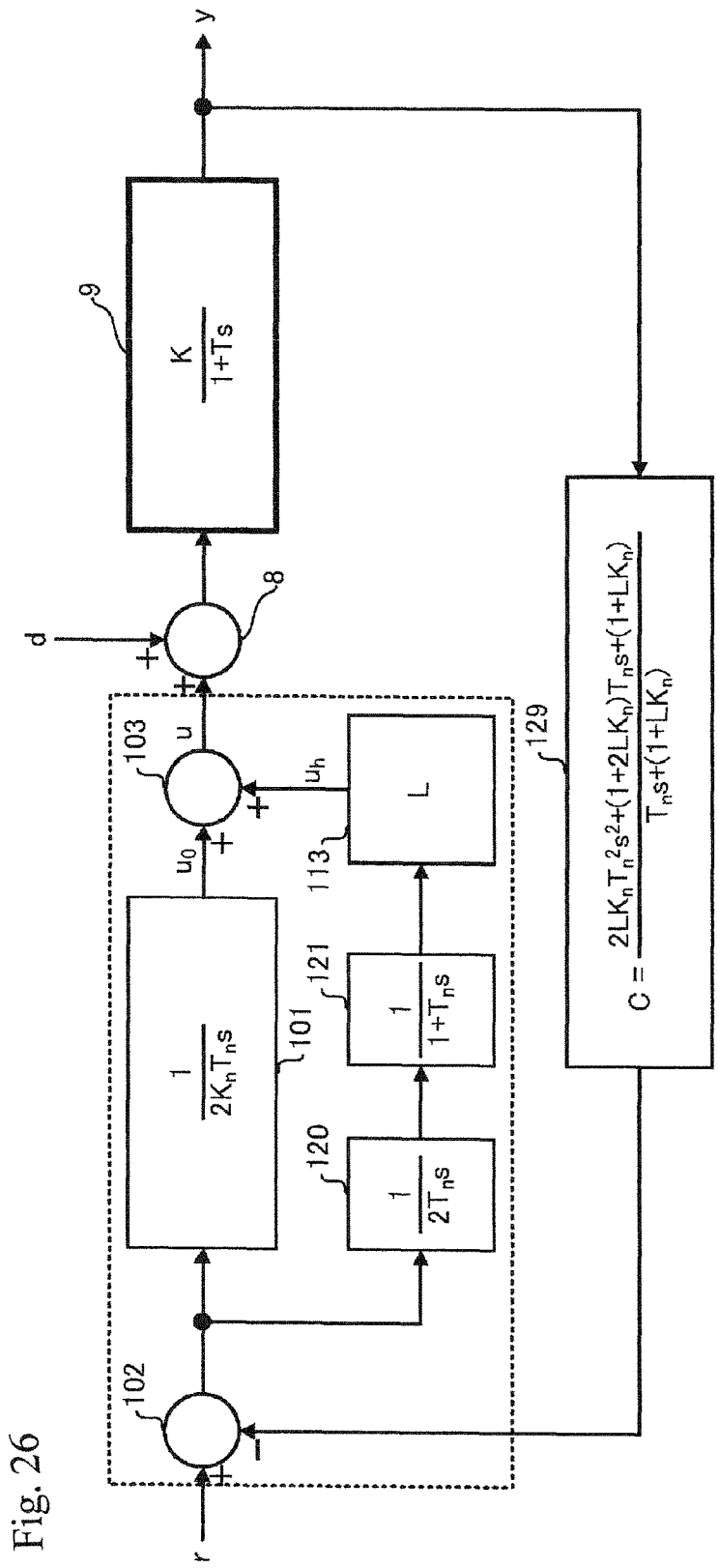
FIG. 26 is a block diagram showing a configuration wherein the feedback control system including a disturbance feedback shown in FIG. 2 is equivalently converted to a loop type two degrees of freedom control system.
Figure 27:
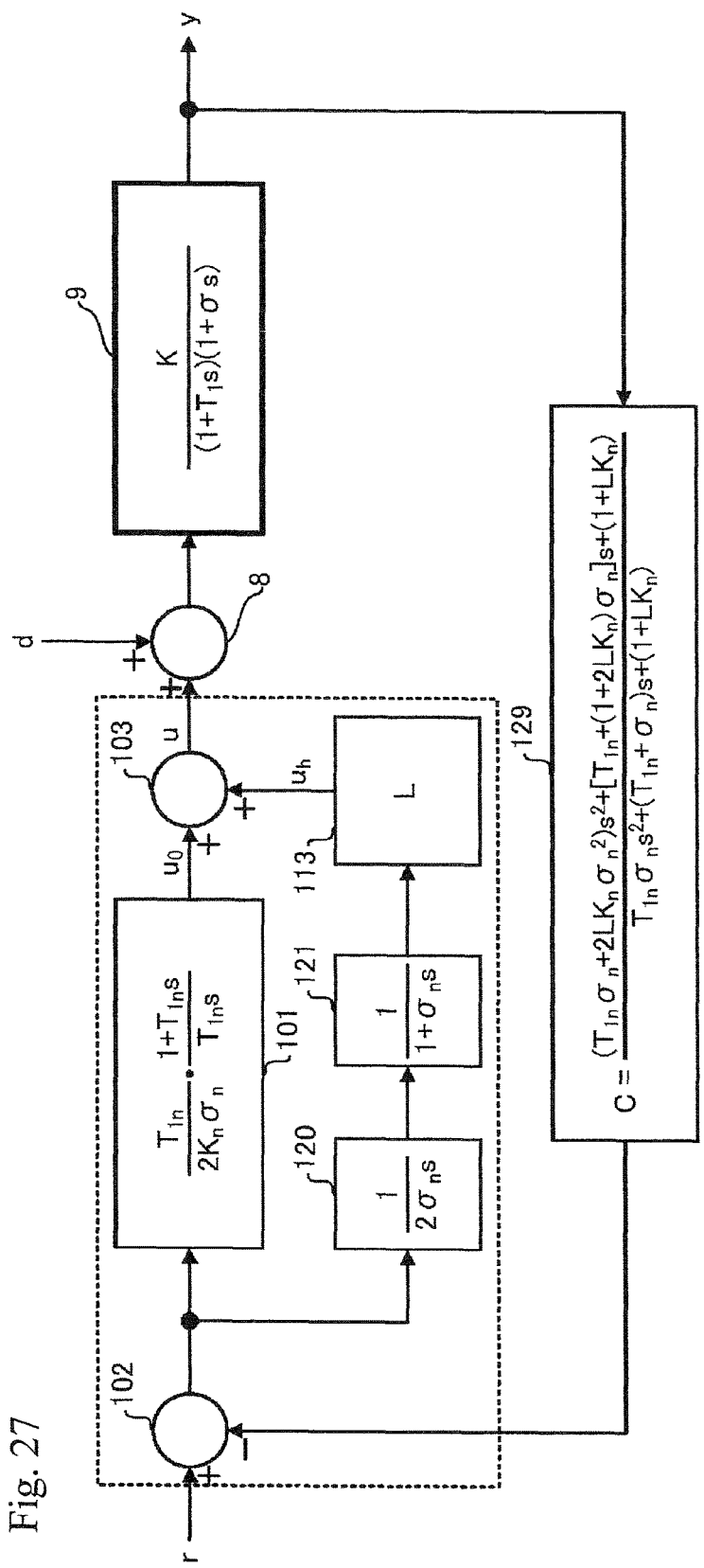
FIG. 27 is a block diagram showing a configuration wherein the feedback control system including a disturbance feedback shown in FIG. 3 is equivalently converted to a loop type two degrees of freedom control system.
Figure 28:
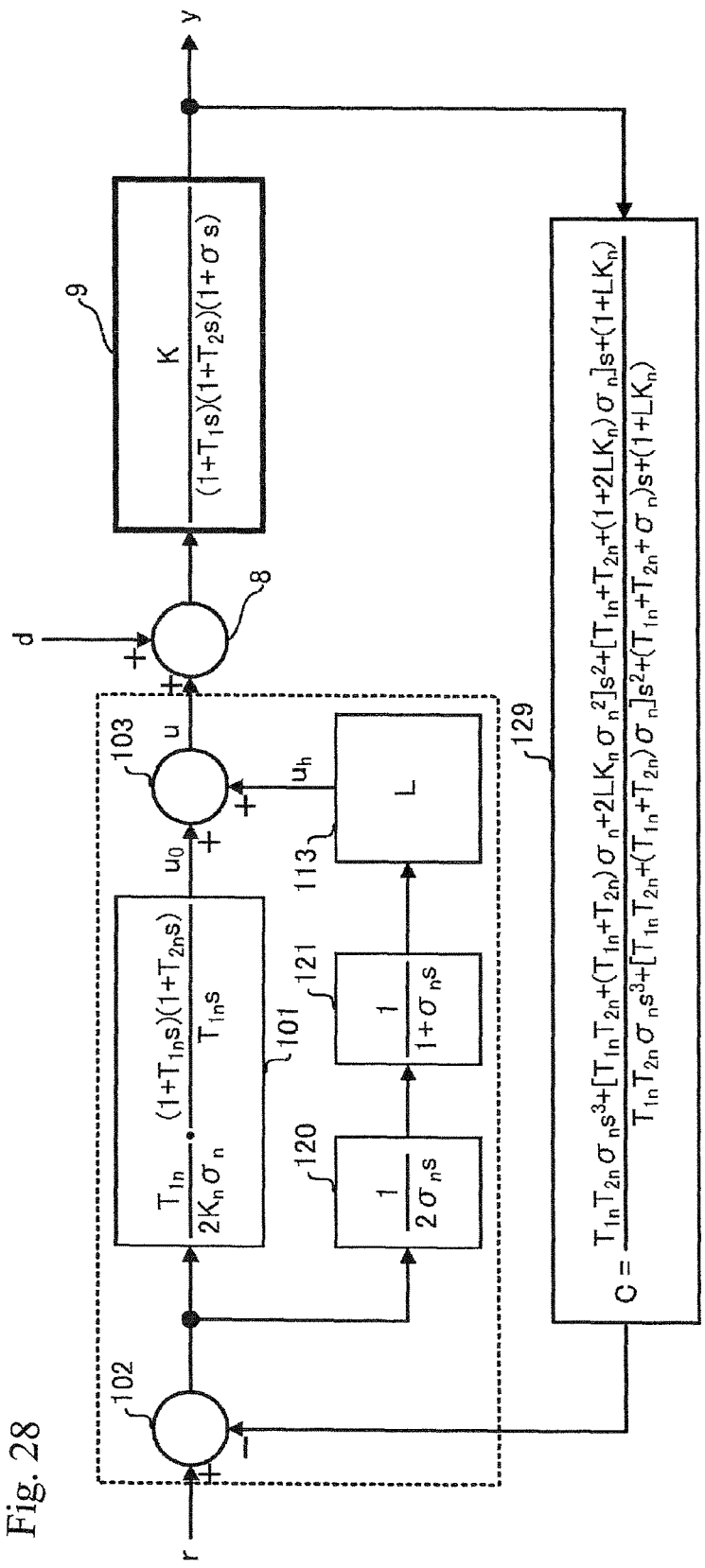
FIG. 28 is a block diagram showing a configuration wherein the feedback control system including a disturbance feedback shown in FIG. 4 is equivalently converted to a loop type two degrees of freedom control system.
Figure 29:
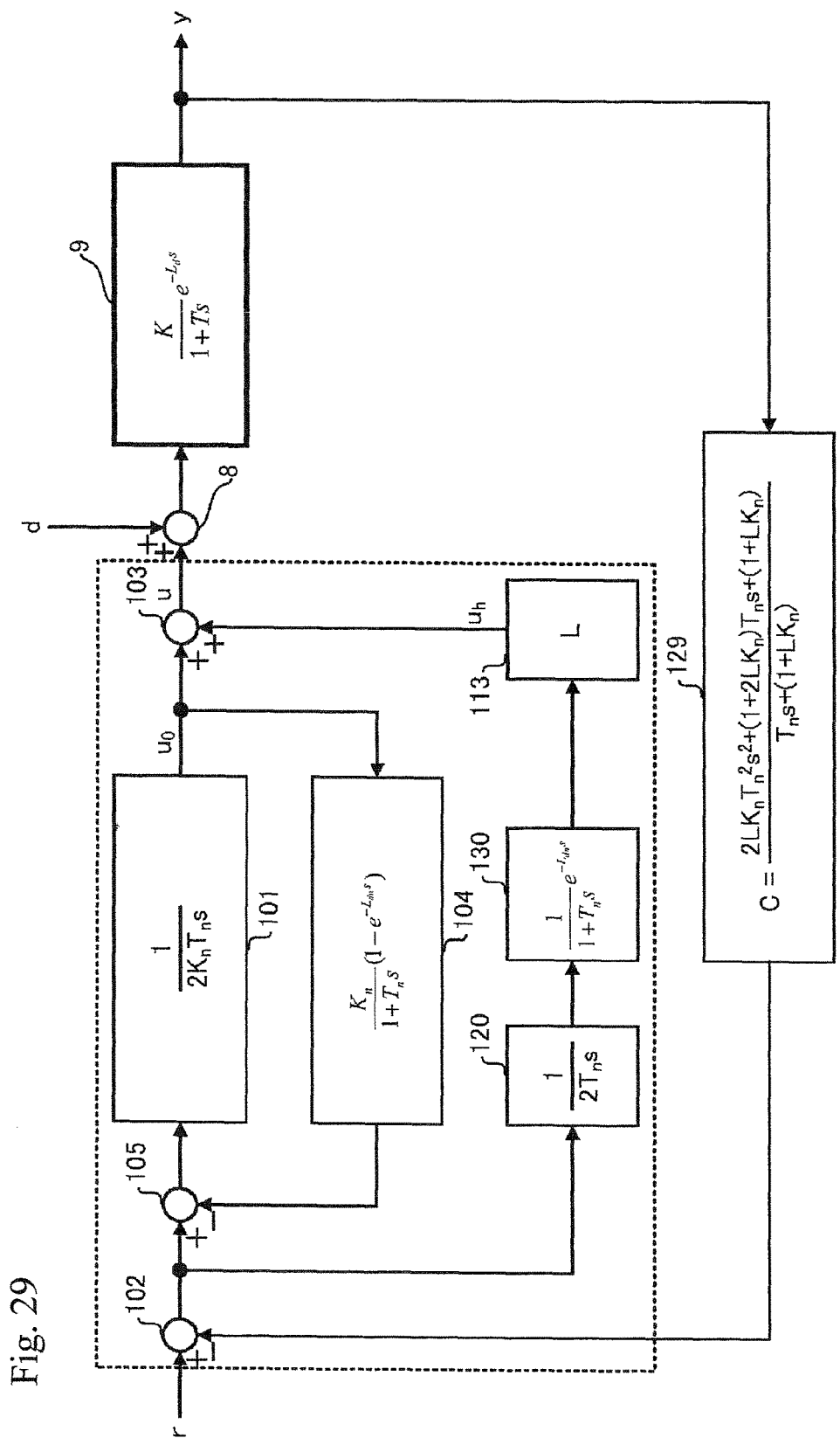
FIG. 29 is a block diagram showing a configuration wherein the feedback control system including a disturbance feedback shown in FIG. 5 is equivalently converted to a loop type two degrees of freedom control system.
Figure 30:
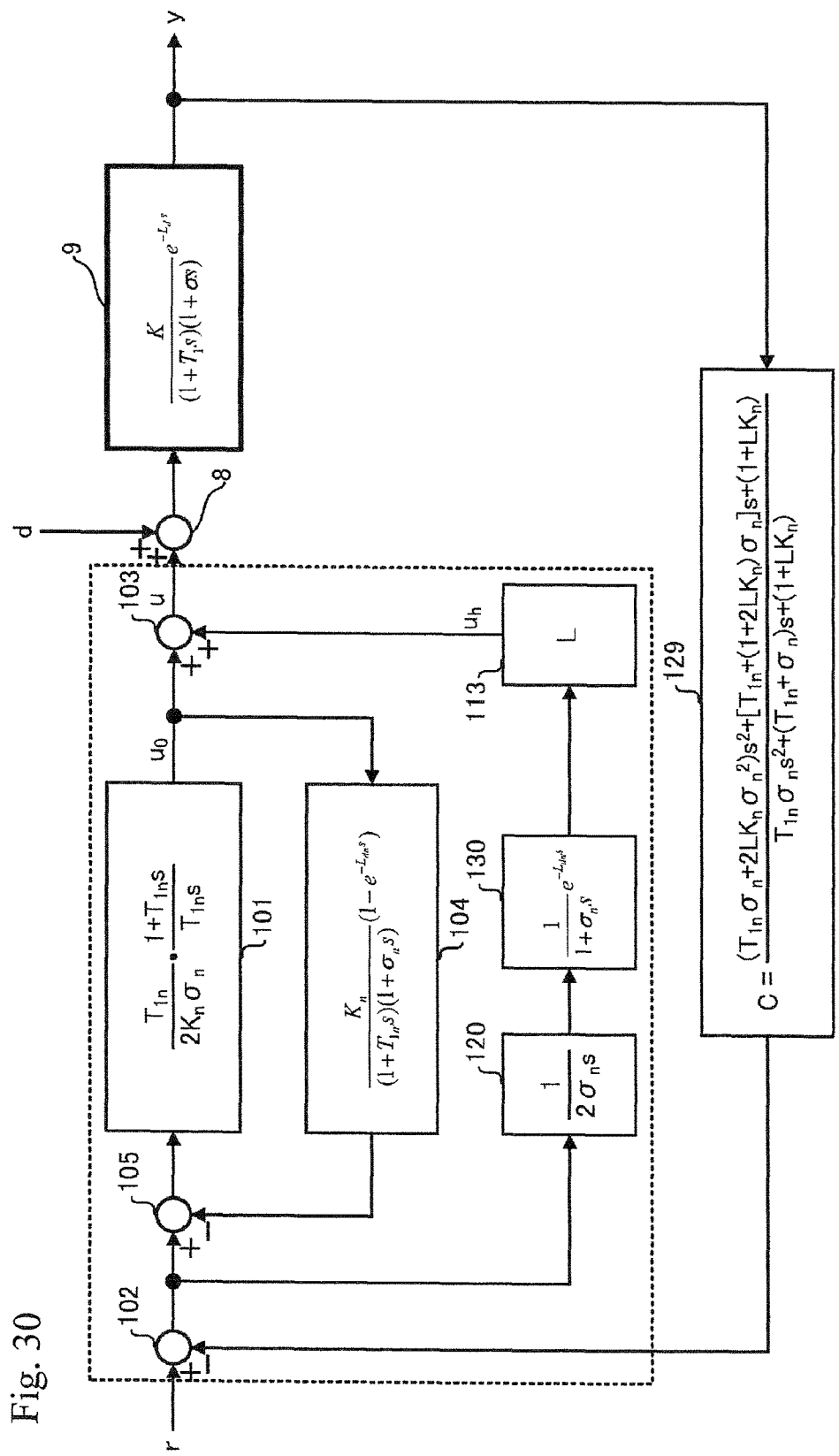
FIG. 30 is a block diagram showing a configuration wherein the feedback control system including a disturbance feedback shown in FIG. 6 is equivalently converted to a loop type two degrees of freedom control system.
Figure 31:
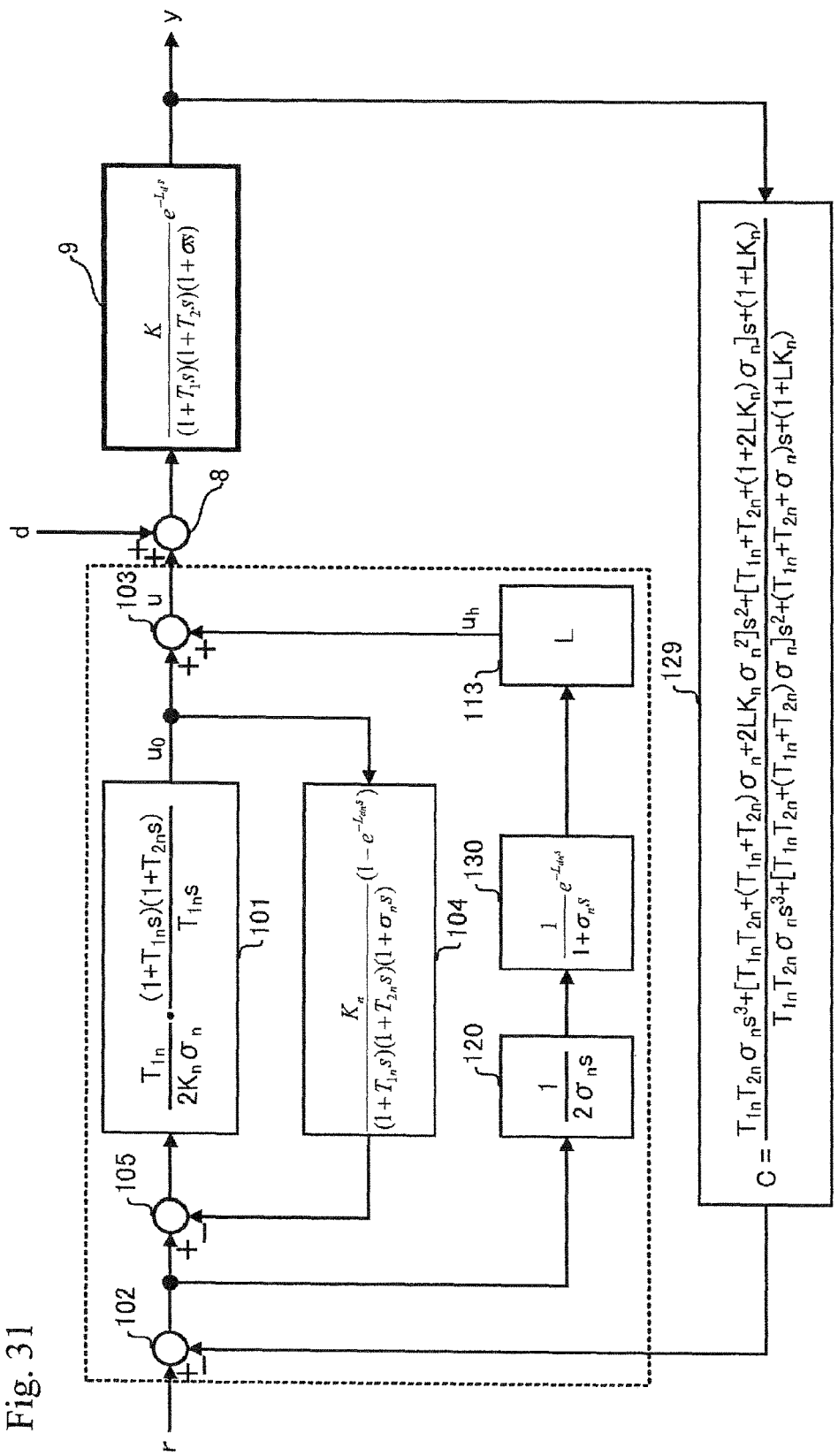
FIG. 31 is a block diagram showing a configuration wherein the feedback control system including a disturbance feedback shown in FIG. 7 is equivalently converted to a loop type two degrees of freedom control system.

FIG. 26 to FIG. 31 show configurations wherein the feedback control systems shown in FIG. 2 to FIG. 7 respectively are equivalently converted to a loop type two degrees of freedom control system. In FIG. 26 to FIG. 28, the feedback controller 101, adders 102 and 103, feedback gain 113, and compensating elements 120 and 121 enclosed by broken lines correspond to a configuration such that an output that the product of an integrator (the compensating element 120) and a first order transfer function (the compensating element 121) is multiplied by L, is added to the output of a general (one-degree-of freedom) PID control system (the output $u_o$ of the feedback controller 101). Furthermore, in the configuration of the loop type two degrees of freedom control system, a (loop) compensating element 129 is added before the input of the manipulated variable y into the adder 102. Also, in FIG. 29 to FIG. 31, the Smith compensator 104 and adder 105 are added to the configurations of FIG. 26 to FIG. 28 respectively, and a first order and time delay transfer function (the compensating element 130) is used in place of the first order transfer function (compensating element 121).

Herein, the product of the compensating element 120 and compensating element 121 (130) in FIG. 26 to FIG. 31 is equivalent to the product of the transfer function $P_n$ of the nominal plant 111 and transfer function K of the feedback controller 101 in FIG. 2 to FIG. 7 respectively. Also, a transfer function C of the compensating element 129 is described by the following Equation (22) in each case.

[Equation 22]

$$C = \frac{L + K + LP_n K}{K + LP_n K} \left( = \frac{1}{F} \right) \quad (22)$$

Consequently, taking the output of the feedback gain 113 to be $u_h$, the manipulated variable u in the loop type two degrees of freedom control systems is

[Equation 23]

$$\begin{aligned} u &= u_0 + u_h \\ &= K(r - Cy) + LP_n K(r - Cy) \\ &= (K + LP_n K)\left(r - \frac{L + K + LP_n K}{K + LP_n K} y\right) \\ &= (K + LP_n K)r - (L + K + LP_n K)y \end{aligned} \quad (23)$$

corresponding to the manipulated variable u in the feedback control system including disturbance feedback shown in Equation (4).

Application Example of Control Device

Figure 32:
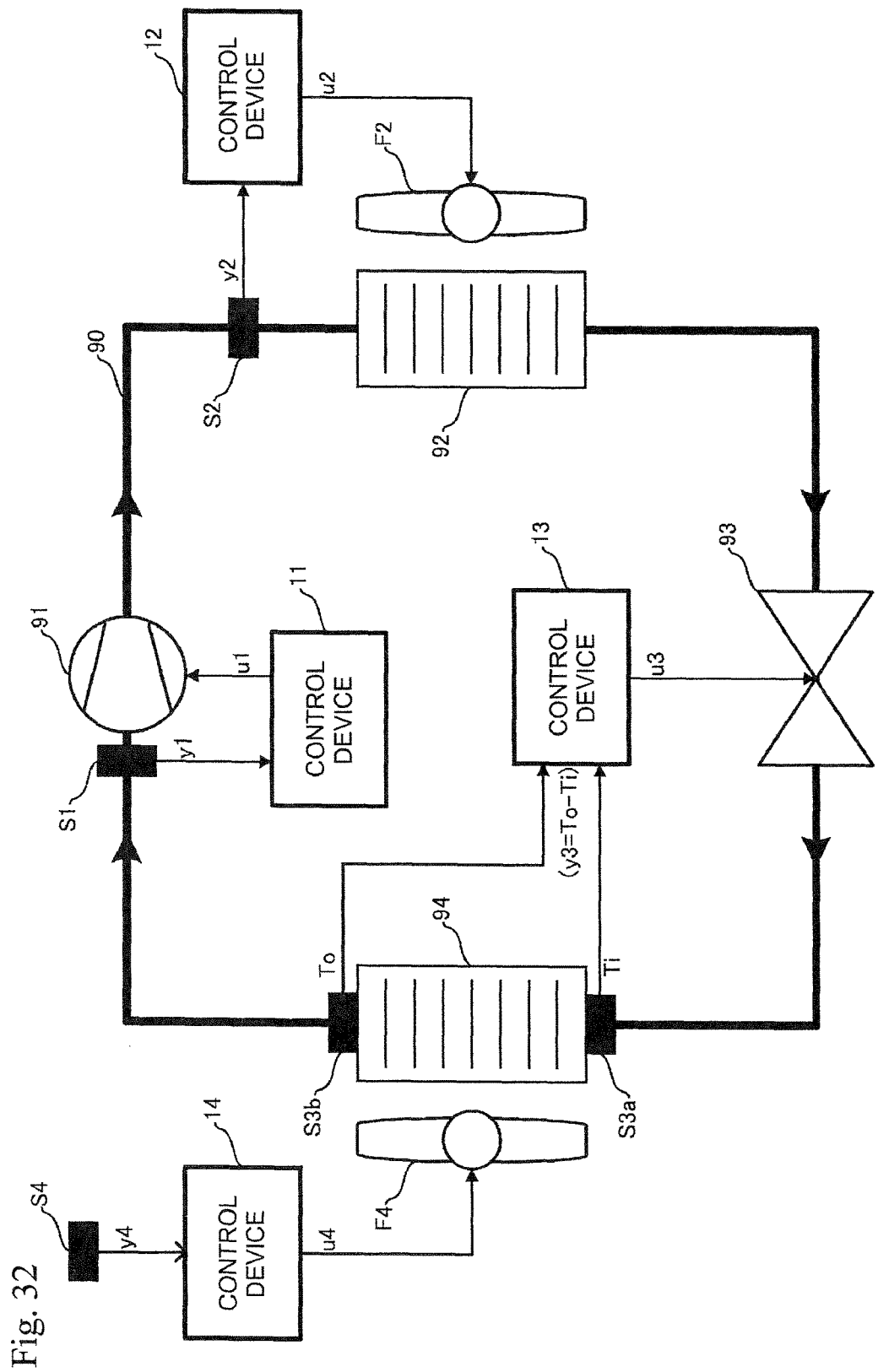
FIG. 32 is a block diagram showing an example wherein the control device in the first and second embodiments of the invention is applied to a refrigeration cycle system.

Hereafter, referring to FIG. 32 to FIG. 34, a description will be given of an example wherein the control device of this embodiment is applied to a refrigeration cycle system. FIG. 32 shows the configuration of the whole refrigeration cycle system, FIG. 33 shows the configuration of each control device in the refrigeration cycle system, and FIG. 34 shows the relationship between manipulated variables (control device outputs) and controlled variables (plant outputs) in the refrigeration cycle system.

The refrigeration cycle system shown in FIG. 32 includes control devices 11 to 14, a refrigerant pipe 90, a compressor 91, a condenser 92, an expansion valve 93, an evaporator 94, and sensors S1, S2, S3a, S3b, and S4. The compressor 91, condenser 92, expansion valve 93, and evaporator 94 are connected to each other via the refrigerant pipe 90, and a refrigerant circulates inside the refrigerant pipe 90. Also, the condenser 92 and evaporator 94 include fans F2 and F4 respectively.

Figure 33:
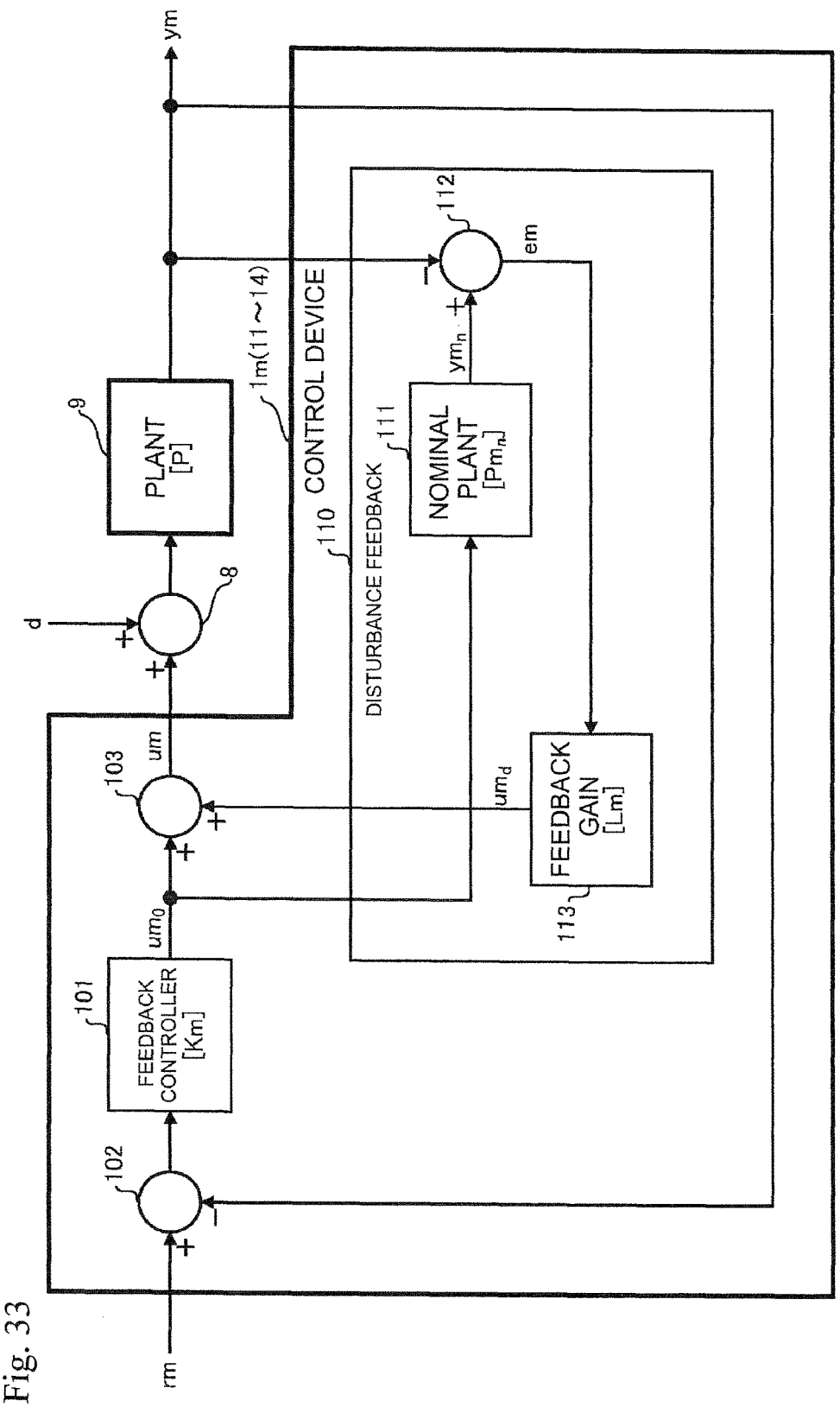
FIG. 33 is a block diagram showing the configuration of each control device in the refrigeration cycle system shown in FIG. 32 in the first embodiment of the invention.

A control device 1m (m=1, 2, 3, 4) shown in FIG. 33 has a configuration same as that of the control device 1 shown in FIG. 1, a controlled variable ym of the plant 9 and a set point rm are input, and a manipulated variable um of the plant 9 is output. The combinations (pairings) of manipulated variables and controlled variables shown in FIG. 34 are an example, and are not limited.

In the application example of FIG. 32, the sensor S1 measures evaporation pressure (low pressure) y1, and the control device 11 outputs the rotation speed u1 of the compressor 91 as a manipulated variable based on the evaporation pressure y1 as a controlled variable and a set point r1 (not shown). Also, the sensor S2 measures condensation pressure (high pressure) y2, and the control device 12 outputs rotation speed u2 of the fan F2 as a manipulated variable based on the condensation pressure y2 as a controlled variable and a set point r2 (not shown). Also, the sensors S3a and S3b measure inlet temperature Ti and outlet temperature To respectively of the evaporator 94, and the control device 13 outputs an open degree u3 of the expansion valve 93 as a manipulated variable based on a degree of overheat y3 (=To−Ti) as a controlled variable and a set point r3 (not shown). Also, the sensor S4 measures a supply temperature y4, and the control device 14 outputs rotation speed u4 of the fan F4 as a manipulated variable based on the supply temperature y4 as a controlled variable and a set point r4 (not shown).

In this way, according to the control device of this embodiment, it is possible to control each controlled variable of the refrigeration cycle system (plant) to the set point. As the instruments forming the refrigerant cycle are connected to each other via the refrigerant pipe 90, it may happen that controls by the control devices interfere with each other, and affect other controls as disturbance. Because of this, by the control device of this embodiment applied to a refrigerant cycle system, it is possible to control the controlled variables to the set point while reducing the effect of interference and disturbance. The control device of this embodiment is also applicable to any one instrument of the compressor 91, condenser 92, expansion valve 93, and evaporator 94 forming the refrigerant cycle, or to a system wherein these instruments are combined.

As previously described, in the design method of the control device of feedback control system 1 including the feedback controller 101 and disturbance feedback 110, by the transfer function most similar to the characteristics of the plant 9 among the six kinds of transfer functions, which are the first order, second order, third order, first order and time delay, second order and time delay, and third order and time delay, being selected as the transfer function $P_n$ of the nominal plant 111, and the transfer function K of the feedback controller 101 determined based on the parameters (gain and time constants) of the nominal plant 111, it is possible to easily design a feedback control system control device that, with only the feedback gain L as an tuning parameter and without using state-space representation, balances set point response controlling the controlled variable y to the set point r and disturbance response reducing the effect of the disturbance d. Furthermore, this kind of feedback control system including a disturbance feedback may be equivalently converted to a two degrees of freedom control system.

Also, by the control device 1 (11 to 14) designed in this way applied to a refrigerant cycle system, it is possible to control the controlled variables to the set points while reducing the effect of interference and disturbance, even when controls by the control devices interfere with each other and affect other controls as disturbance.

(Second Embodiment)

Design Method of Control Device

Hereafter, referring to FIG. 35 to FIG. 37, a description will be given of a design method of control device in a second embodiment.

Figure 35:
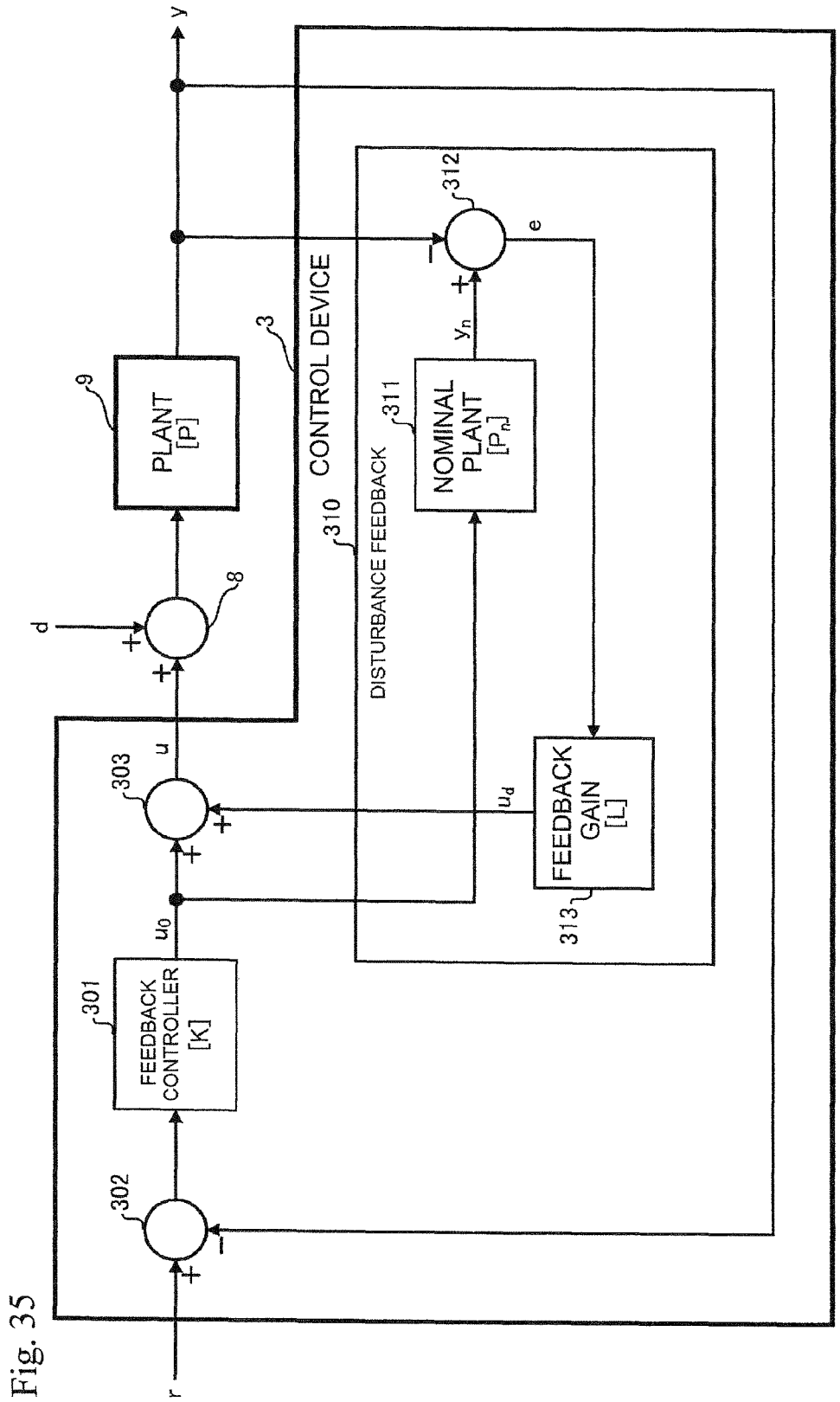
FIG. 35 is a block diagram showing a configuration of a feedback control system including a disturbance feedback according to a design method of control device in a second embodiment of the invention.
Figure 36:
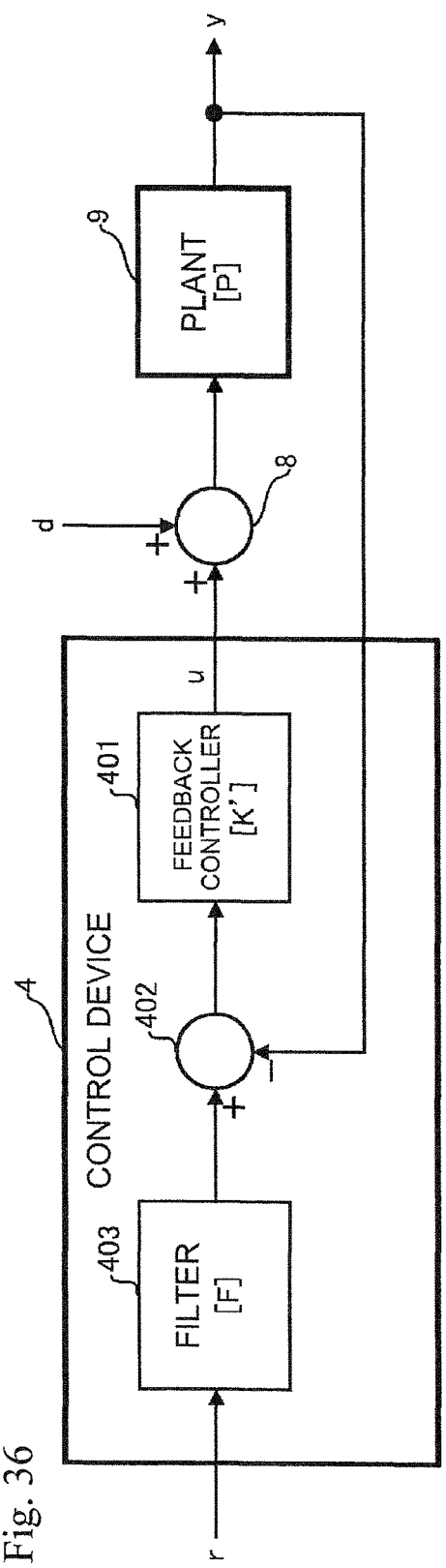
FIG. 36 is a block diagram showing a configuration of a set point filter type two degrees of freedom PID control system according to the design method of control device in the second embodiment of the invention.

In this embodiment, firstly, a feedback control system shown in FIG. 35 is equivalently converted to a two degrees of freedom PID control system shown in FIG. 36.

A feedback control system control device 3 shown in FIG. 35 includes, in addition to a feedback controller 301 and adder 302, an adder 303 and disturbance feedback 310 in order to reduce the effect of the disturbance d. Also, the disturbance feedback 310 includes a nominal plant 311, an adder 312, and a feedback gain 313.

A control output (controlled variable y) from the plant 9 and the set point r are input into the adder 302, and the difference between the set point r and controlled variable y (r−y) is input from the adder 302 into the feedback controller 301 (second feedback controller). Consequently, taking a transfer function of the feedback controller 301 to be K, the output $u_0$ of the feedback controller 301 is as in Equation (1) above.

The output $u_0$ of the feedback controller 301 is inputs into the nominal plant 311 of the disturbance feedback 310. Consequently, taking a transfer function of the nominal plant 311 to be $P_n$, the output $y_n$ of the nominal plant 311 is as in Equation (2) above. Also, the output $y_n$ of the nominal plant 311 and the controlled variable y are input into the adder 312, and the difference e between the output $y_n$ of the nominal plant 311 and the controlled variable y (=$y_n$−y) is input from the adder 312 into the feedback gain 313. Consequently, taking the value of the feedback gain 313 to be L (hereafter called the feedback gain L), the disturbance estimation value $u_d$ outputs from the feedback gain 313 is as in Equation (3) above.

The output $u_0$ of the feedback controller 301 and the disturbance estimation value $u_d$ are input into the adder 303, and the sum of the output $u_0$ of the feedback controller 301 and the disturbance estimation value $u_d$ is output from the adder 303 as a control input (manipulated variable u) with respect to the plant 9. Consequently, the manipulated variable u is [Equation. 24]

$$u = u_0 + u_d \quad (24)$$

Herein, the disturbance estimation value $u_d$, being estimated so as to attenuate the disturbance d, is negative when the disturbance d is positive, and positive when the disturbance d is negative. Further, by the disturbance estimation value $u_d$ added to the output $u_0$ of the feedback controller 301 in the adder 303, the disturbance d added to the manipulated variable u in the adder 8 is compensated.

The reference sign of the disturbance estimation value $u_d$ may be changed appropriately in accordance with the treatment of the disturbance estimation value $u_d$ in the adder 303 or the treatment of the disturbance d in the adder 8. For example, in FIG. 35, when the adder 303 is changed such that the disturbance estimation value $u_d$ is subtracted from the output $u_0$ of the feedback controller 301, the disturbance d can be attenuated by the disturbance estimation value $u_d$ estimated such that the reference sign corresponds with the disturbance d. Also, for example, in FIG. 35, when the adder 8 is changed such that the disturbance d is subtracted from the manipulated variable u, it is sufficient that the disturbance estimation value $u_d$ is estimated such that the reference sign corresponds with the disturbance d.

A two degrees of freedom PID control system control device 4 shown in FIG. 36 includes, in addition to a feedback controller 401 and adder 402, a filter 403. The two degrees of freedom PID control system, being formed such that the set point r is input into the PID control system via the filter 403, is called a set point filter type (for example, refer to NPL 3).

The set point r is input into the filter 403, and the output of the filter 403 and the controlled variable y are input into the adder 402. Also the difference between the output of the filter 403 and the controlled variable y is input from the adder 402 into the feedback controller 401 (first feedback controller), and the manipulated variable u is output from the feedback controller 401. Consequently, taking the transfer functions of the feedback controller 401 and filter 403 to be K' and F respectively, the manipulated variable u is [Equation. 25]

$$u = K'(Fr - y) \quad (25)$$

In the set point filter type two degrees of freedom PID control system, the transfer function K' of the feedback controller 401 and the transfer function F of the filter 403 are expressed as in the following Equation (26) and Equation (27) respectively

[Equation. 26]

$$K'(s)K_P\left\{1 + \frac{1}{T_I s} + T_D D(s)\right\} \quad (26)$$

$$F(s) = \frac{1 + (1-\alpha)T_I s + (1-\beta)T_I T_D s D(s)}{1 + T_I s + T_I T_D s D(s)} \quad (27)$$

Herein, $K_P$ is proportional gain, $T_I$ is integral time, $T_D$ is derivative time, and α and β are two degrees of freedom parameters. Also, D (s) is an approximate derivative, taken to be

[Equation. 27]

$$D(s) = \frac{s}{1 + \tau s} \quad (28)$$

Herein τ is a time constant.

When Equation (2) and Equation (1) are substituted into Equation (3), the following Equation (29) is obtained.
[Equation. 28]

$$u_d = LP_n K(r-y) - Ly \quad (29)$$

Furthermore, when Equation (1) and Equation (29) are substituted into Equation (24), the following Equation (30) is obtained. [Equation. 29]

$$u = K(r-y) + LP_n K(r-y) - Ly \quad (30)$$

Further, when Equation (30) is rearranged in terms of the set point r and controlled variable y, the following Equation (31) is obtained.

[Equation. 30]

$$u = (L + K + LP_n K)\left(\frac{K + LP_n K}{L + K + LP_n K} r - y\right) \quad (31)$$

Consequently, when comparing Equation (25) and Equation (31),

[Equation. 31]

$$K' = L + K + LP_n K \quad (32)$$

$$F = \frac{K + LP_n K}{L + K + LP_n K} \quad (33)$$

Figure 37:
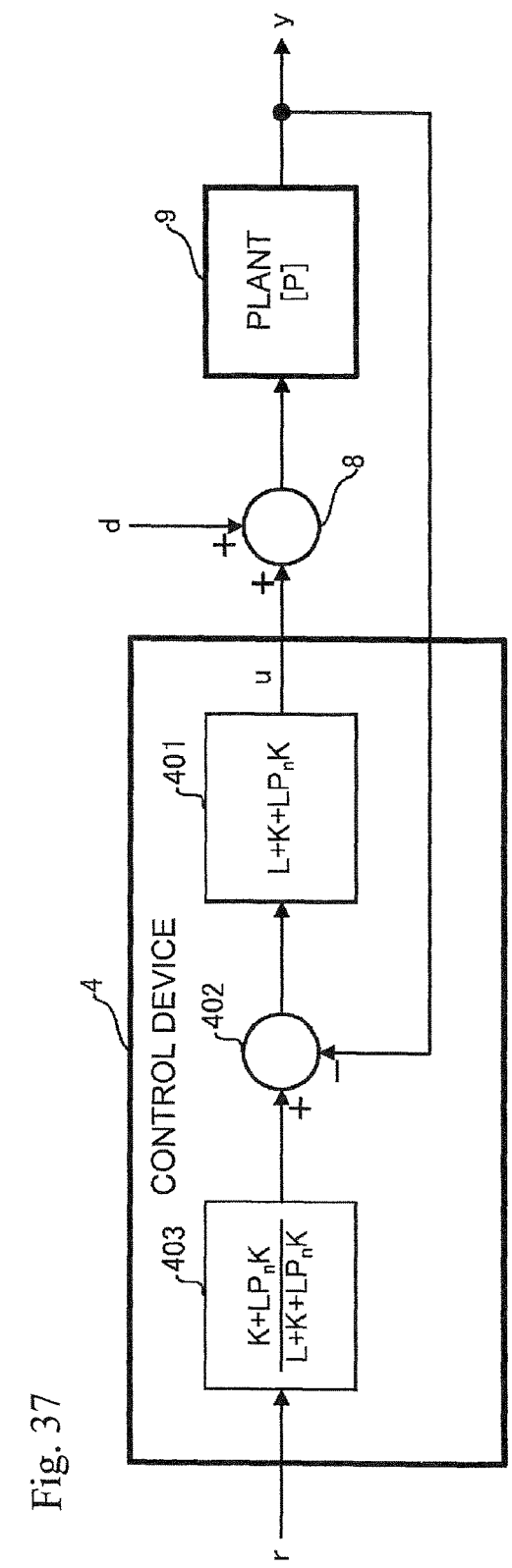
FIG. 37 is a block diagram showing a configuration of a set point filter type two degrees of freedom PID control system wherein a feedback control system including a disturbance feedback has been equivalently converted.

In this way, a feedback control system including a disturbance feedback can be equivalently converted to a set point filter type two degrees of freedom PID control system, as shown in FIG. 37. Further, from Equation (32) and Equation (33), the transfer function K' of the feedback controller 401 and the transfer function F of the filter 403 are both determined based on the feedback gain L, transfer function K of the feedback controller 301, and transfer function $P_n$ of the nominal plant 311.

Next, the transfer function K of the feedback controller 301 and transfer function $P_n$ of the nominal plant 311 are defined such that the transfer function K' of the feedback controller 401 and transfer function F of the filter 403 conform to the forms of Equation (26) and Equation (27) respectively.

In this embodiment, the transfer function $P_n$ of the nominal plant 311 is defined as a first order transfer function shown in the following Equation (34).

[Equation 32]

$$P_n(s) = \frac{K_{pn}}{1 + T_{pn}s} \quad (34)$$

Herein, $K_{pn}$ and $T_{pn}$ are a gain and time constant respectively of the nominal plant 311. Also, using the gain $K_{pn}$ and time constant $T_{pn}$ of the nominal plant 311, the transfer function K of the feedback controller 301 is defined as

[Equation 35]

$$K(s) = \frac{1 + T_{pn}s}{K_{pn}s}\left(= \frac{1}{P_n} \cdot \frac{1}{s}\right) \quad (35)$$

When substituting Equation (34) and Equation (35) into Equation (32), and rearranging in terms of 1/s, the following Equation (36) is obtained.

[Equation 34]

$$K'(s) = L + \frac{1 + T_{pn}s}{K_{pn}s} + L\frac{1}{s} \quad (36)$$
$$= \left(\frac{K_{pn}L + T_{pn}}{K_{pn}}\right)\left(1 + \frac{K_{pn}L + 1}{K_{pn}L + T_{pn}} \cdot \frac{1}{s}\right)$$

Consequently, when comparing Equation (26) and Equation (36),

[Equation 35]

$$K_P = \frac{K_{pn}L + T_{pn}}{K_{pn}} \quad (37)$$

$$T_I = \frac{K_{pn}L + T_{pn}}{K_{pn}L + 1} \quad (38)$$

$$T_D = 0 \quad (39)$$

Also, when substituting Equation (34) and Equation (35) into Equation (33), and rearranging in terms of s, the following Equation (40) is obtained.

[Equation 36]

$$F(s) = \frac{\frac{1+T_{pn}s}{K_{pn}s} + L\frac{1}{s}}{L + \frac{1+T_{pn}s}{K_{pn}s} + L\frac{1}{s}} = \frac{\frac{1+T_{pn}}{K_{pn}L+1}s}{1 + \frac{K_{pn}L+T_{pn}}{K_{pn}L+1}s} \quad (40)$$

Consequently, when comparing Equation (27) and Equation (40),

[Equation 37]

$$T_I = \frac{K_{pn}L + T_{pn}}{K_{pn}L + 1} \quad (41)$$

$$(1 - \alpha) = \frac{T_{pn}}{K_{pn}L + 1} \frac{1}{T_I} = \frac{T_{pn}}{K_{pn}L + T_{pn}} \quad (42)$$

$$T_D = 0 \quad (43)$$

Equation (41) and Equation (43) correspond to Equation (38) and Equation (39) respectively.

In this way, from Equation (36) and Equation (40), the transfer function K' of the feedback controller 401 and transfer function F of the filter 403 in the set point filter type two degrees of freedom PID control system after equivalent conversion are determined based on the gain $K_{pn}$ and time constant $T_{pn}$ of the nominal plant 311 and on the feedback gain L. Also, because of this, the proportional gain $K_P$ is given by Equation (37), the integral time $T_I$ is given by Equation (38) and Equation (41), and the two degrees of freedom parameter α is given by Equation (42). Furthermore, from Equation (39) and Equation (43), the derivative time $T_D$ is 0, and setting of the two degrees of freedom parameter β is unnecessary.

As heretofore described, in this embodiment, the engineer, firstly, carries out equivalent conversion of the feedback control system including a disturbance feedback of FIG. 35 to the set point filter type two degrees of freedom PID control system of FIG. 36. Next, in the set point filter type two degrees of freedom PID control system after equivalent conversion, the derivative time $T_D$ of the transfer function K' of the feedback controller 401 and transfer function F of the filter 403 is set to 0. Also, in the feedback control system before equivalent conversion, a first order transfer function applied to the transfer function $P_n$ of the nominal plant 311, and furthermore, the transfer function K of the feedback controller 301 is determined based on the gain $K_{pn}$ and time constant $T_{pn}$ of the nominal plant 311.

Because of this, the transfer function K' of the feedback controller 401 and transfer function F of the filter 403 are determined based on the gain $K_{pn}$ and time constant $T_{pn}$ of the nominal plant 311, and on the feedback gain L. Therefore, the engineer, by identifying the first order transfer function of the nominal plant 311 from experiment or simulation data in accordance with a least squares method, a prediction error method, or the like, thus obtaining the gain $K_{pn}$ and time constant $T_{pn}$, can determine the transfer function K' of the feedback controller 401 and transfer function F of the filter 403, with only the feedback gain L as an tuning parameter. Further, as the control device 4 designed in this way outputs the same manipulated variable u as the control device 3 including disturbance feedback, it is possible to balance set point response controlling the controlled variable y to the set point r and disturbance response reducing the effect of the disturbance d.

Figure 38:
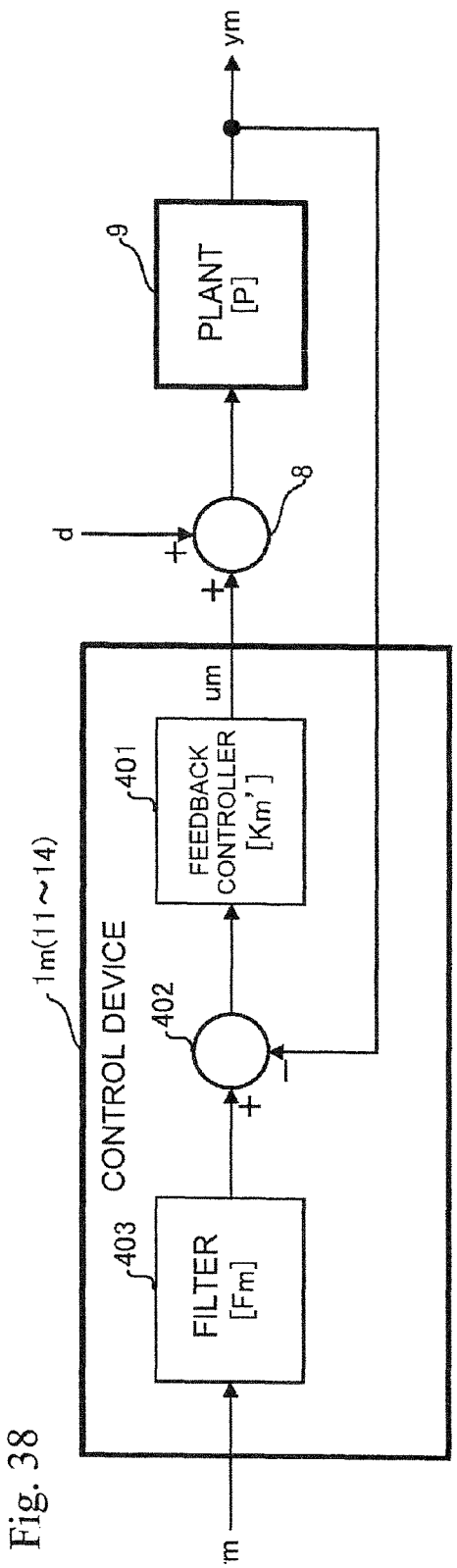
FIG. 38 is a block diagram showing the configuration of each control device in the refrigeration cycle system shown in FIG. 32 in the second embodiment of the invention.
Figure 39:
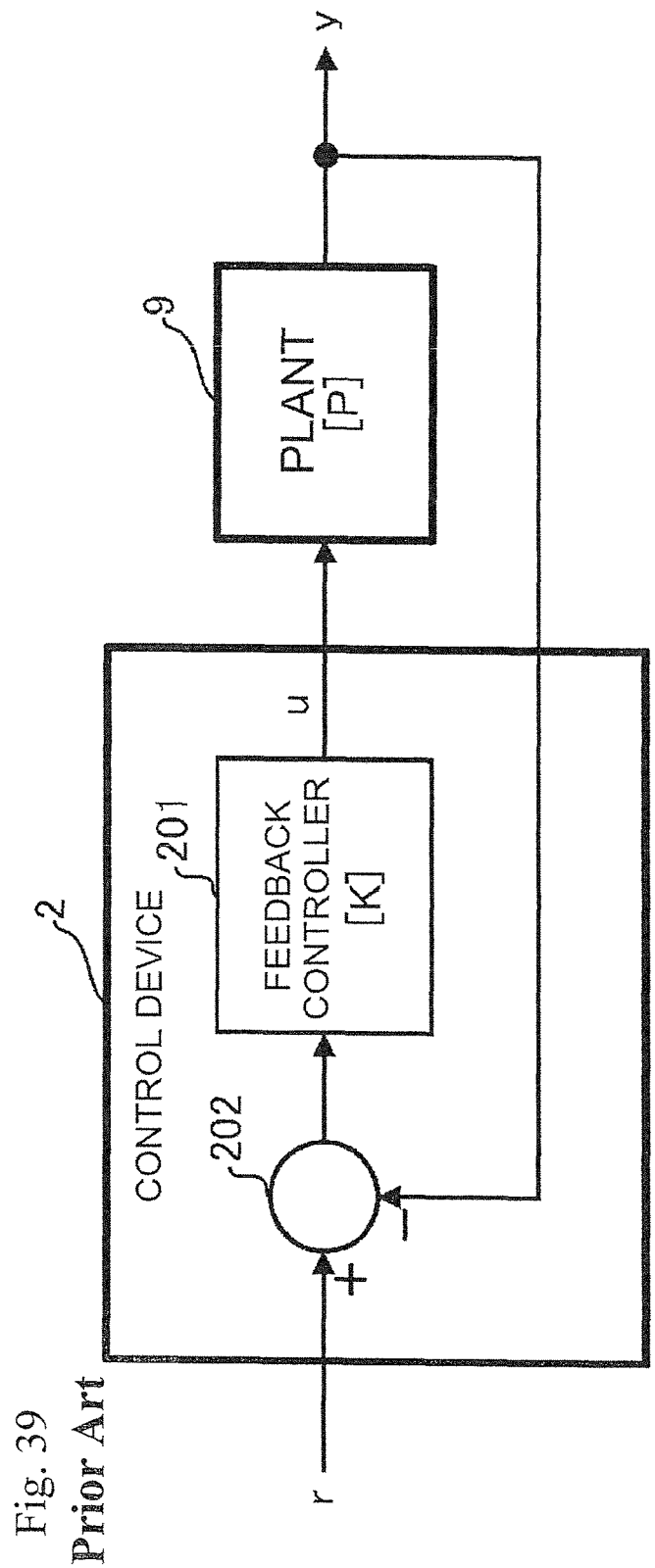
FIG. 39 is a block diagram showing a configuration of a general feedback control system control device.
Figure 40:
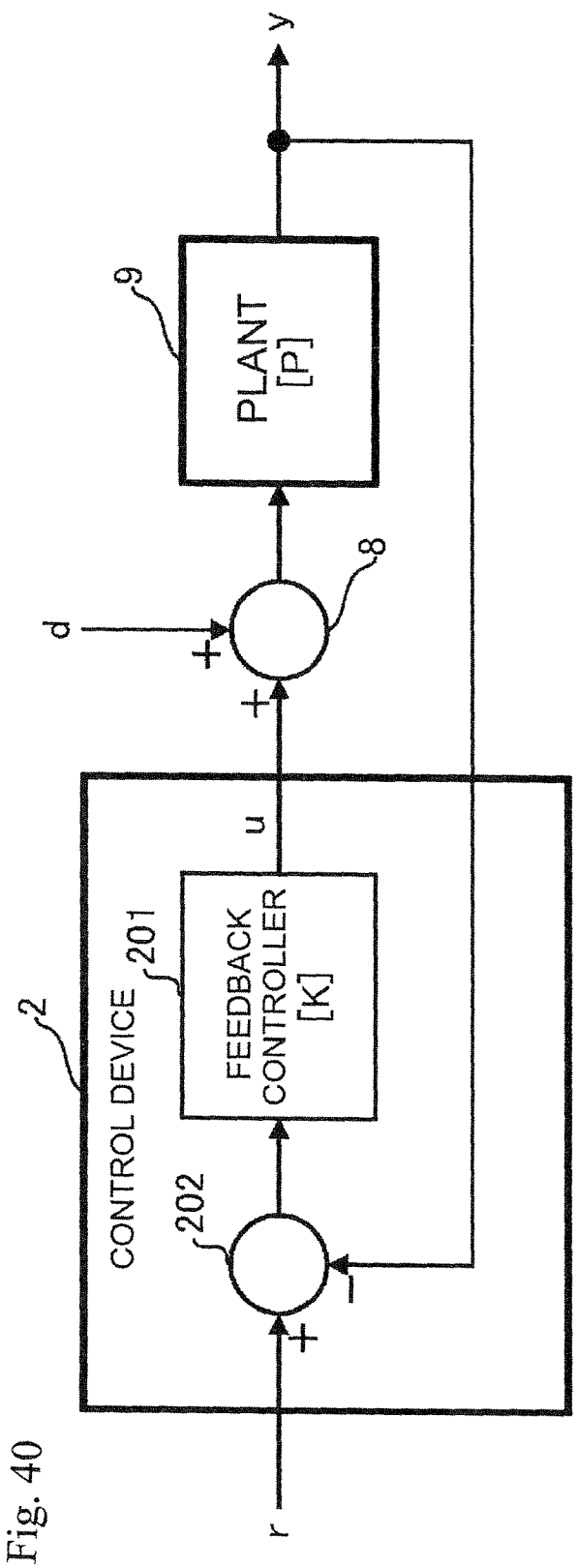
FIG. 40 is a diagram illustrating the effect of disturbance in the feedback control system shown in FIG. 39.

Also, the control device 4 of this embodiment is applicable to the kind of refrigerant cycle system shown in FIG. 32, in the same way as the control device 1 of the first embodiment. The control device 1m (m=1, 2, 3, 4) shown in FIG. 38 is a configuration the same as that of the control device 4 shown in FIG. 36; and the controlled variable ym of the plant 9 and the set point rm thereof are input, and the manipulated variable um of the plant 9 is output.

As previously described, in the design method of control device whereby the controlled variable y of the plant 9 is controlled to the set point r, by the transfer function K' of the feedback controller 401 (first feedback controller) and the transfer function F of the filter 403 in the set point filter type two degrees of freedom PID control system of FIG. 36, both being determined based on the feedback gain L, transfer function K of the feedback controller 301 (second feedback controller), and transfer function $P_n$ of the nominal plant 311 in the feedback control system including disturbance feedback of FIG. 35, it is possible to easily design a control device such that a feedback control system including a disturbance feedback is equivalently converted to a set point filter type two degrees of freedom PID control system, without using an state-space representation. Further, as the control device 4 designed in this way outputs the same manipulated variable u as the control device 3 including disturbance feedback, it is possible to balance set point response controlling the controlled variable y to the set point r and disturbance response reducing the effect of the disturbance d.

Also, by the derivative time $T_D$ of the transfer function K' of the feedback controller 401 and transfer function F of the filter 403 set to 0 in the set point filter type two degrees of freedom PID control system after equivalent conversion, a first order transfer function adopted as the transfer function $P_n$ of the nominal plant 311 in the feedback control system before equivalent conversion, and furthermore, the transfer function K of the feedback controller 301 determined based on the gain $K_{pn}$ and time constant $T_{pn}$ of the nominal plant 311, the transfer function K' of the feedback controller 401 and transfer function F of the filter 403 can be determined based on the gain $K_{pn}$ and time constant $T_{pn}$ of the nominal plant 311, and on the feedback gain L.

Also, by identifying the first order transfer function of the nominal plant 311, thus obtaining the gain $K_{pn}$ and time constant $T_{pn}$, it is possible to determine the transfer function K' of the feedback controller 401 and transfer function F of the filter 403, with only the feedback gain L as a tuning parameter. That is, while normally needing to tune five parameters (the proportional gain $K_P$, integral time $T_I$, derivative time $T_D$, and two degrees of freedom parameters α and β) when designing a two degrees of freedom PID control system, as shown in Equation (26) and Equation (27), in the design method of control device of the heretofore described embodiment, it is possible to design with only the one tuning parameter (L).

Also, by the control device 4 (11 to 14) designed in this way applied to a refrigerant cycle system, it is possible to control the controlled variables to the set points while reducing the effect of interference and disturbance, even when controls by the control devices interfere with each other and affect other controls as disturbance.

The heretofore described embodiments are for facilitating understanding of the invention, and interpretation of the invention is not limited to this. The invention may be changed or improved without departing from the scope thereof, and equivalents thereof are also included in the invention.

REFERENCE SIGNS LIST

1 to 4 Control device
8 Adder
9 Plant
1m (11 to 14) Control device
90 Refrigerant pipe
91 Compressor
92 Condenser
93 Expansion valve
94 Evaporator
101, 201 Feedback controller
102, 103, 105, 112, 123, 125, 127, 202 Adder
104 Smith compensator
110 Disturbance feedback
111 Nominal plant
113 Feedback gain
120 to 122, 124, 126, 128 to 130 Compensating element
301, 401 Feedback controller
302, 303, 312, 402 Adder
310 Disturbance feedback
311 Nominal plant
313 Feedback gain
403 Filter
F2, F4 Fan
S1, S2, S3a, S1b, S4 Sensor

What is claimed is:

1. A method of designing a control device that controls a controlled variable of a plant to a set point, the control device comprising a feedback control system, which includes:

a feedback controller into which a difference between the set point and the controlled variable is input, and a disturbance feedback that outputs a disturbance estimation value wherein a difference between an output of a nominal plant into which an output of the feedback controller is input, and the controlled variable, is multiplied by a feedback gain, and which outputs a manipulated variable of the plant based on the output of the feedback controller and the disturbance estimation value, the method of designing a control device comprising:

selecting one of a first order transfer function, a second order transfer function, a third order transfer function, a first order and time delay transfer function, a second order and time delay transfer function, and a third order and time delay transfer function as a transfer function of the nominal plant in accordance with characteristics of the plant; and determining a transfer function of the feedback controller based on a gain and time constant of the nominal plant, wherein when the first order transfer function in Equation (1) is selected as a transfer function $P_n$ of the nominal plant, a transfer function K of the feedback controller is determined in Equation (2) based on a gain $K_n$ and time constant $T_n$ of the nominal plant, when the second order transfer function in Equation (3) is selected as the transfer function $P_n$ of the nominal plant, the transfer function K of the feedback controller is determined as in Equation (4) based on the gain $K_n$ and time constants $T_{1n}$ and $\sigma_n$ of the nominal plant, and when the third order transfer function in Equation (5) is selected as the transfer function $P_n$ of the nominal plant, the transfer function K of the feedback controller is determined in Equation (6) based on the gain $K_n$ and time constants $T_{1n}$, $T_{2n}$, and $\sigma_n$ of the nominal plant, $$P_n = \frac{K_n}{1 + T_n s} \quad (1)$$

$$K = \frac{1}{2K_n T_n s} \quad (2)$$

$$P_n = \frac{K_n}{(1 + T_{1n}s)(1 + \sigma_n s)}, \sigma_n < T_{1n} \quad (3)$$

$$K = \frac{T_{1n}}{2K_n \sigma_n} \cdot \frac{1 + T_{1n}s}{T_{1n}s} \quad (4)$$

$$P_n = \frac{K_n}{(1 + T_{1n}s)(1 + T_{2n}s)(1 + \sigma_n s)}, \sigma_n < T_{2n} < T_{1n} \quad (5)$$

$$K = \frac{T_{1n}}{2K_n \sigma_n} \cdot \frac{(1 + T_{1n}s)(1 + T_{2n}s)}{T_{1n}s}. \quad (6)$$

2. The design method of control device according to claim 1, wherein when the first order and time delay transfer function, the second order and time delay transfer function, or the third order and time delay transfer function is selected as the transfer function of the nominal plant, a Smith compensator is appended to the transfer function of the feedback controller.

3. The design method of control device according to claim 1, wherein the feedback control system where the transfer function of the nominal plant is selected and the transfer function of the feedback controller is determined, is further equivalently converted to a two degrees of freedom control system.

4. A control device, designed by the design method of control device according to claim 1.

5. The control device according to claim 4, wherein the plant is any one of instruments including a compressor, a condenser, an expansion valve, and an evaporator forming a refrigerant cycle, or a system wherein the instruments are combined.

6. A method of designing a control device configured as a set point filter type two degrees of freedom PID control system, the control device comprising:
 a filter into which a set point of a controlled variable of a plant is input, and
 a first feedback controller into which a difference between an output of the filter and the controlled variable is input, and which outputs a manipulated variable of the plant,
 the control device controlling the controlled variable to the set point,
 the design method of the control device comprising:
 equivalently converting a feedback control system to the set point filter type two degree of freedom PID control system, the feedback control system including a second feedback controller into which a difference between the set point and the controlled variable is input, and a disturbance feedback that outputs a difference between an output of a nominal plant into which an output of the second feedback controller is input, and the controlled variable, with multiplying by a feedback gain; and
 in the equivalently converting the feedback control system, determining a transfer function F of the filter and a transfer function K' of the first feedback controller based on the feedback gain L, a transfer function K of the second feedback controller, and a transfer function Pn of the nominal plant, according to following equations 7 and 8:

$$K' = L + K + LP_n K \quad (7)$$

$$F = \frac{K + LP_n K}{L + K + LP_n K}. \quad (8)$$

7. The design method of control device according to claim 6, wherein a derivative time of the transfer function of the filter and the transfer function of the first feedback controller is 0,
 the transfer function of the nominal plant is a first order transfer function, and
 the transfer function of the second feedback controller is determined based on a gain and time constant of the nominal plant.

8. The design method of control device according to claim 7, wherein the first order transfer function is identified to obtain the gain and time constant of the nominal plant, and
 the transfer function of the filter and the transfer function of the first feedback controller are determined based on the gain and time constant of the nominal plant, with only the feedback gain as a tuning parameter.

9. A control device, designed by the design method of control device according to claim 6.

10. A control device that controls a controlled variable of a plant to a set point, comprising:
 a set point filter type two degrees of freedom PID control system including
 a filter into which the set point is input, and
 a first feedback controller into which a difference between an output of the filter and the controlled variable is input and which outputs a manipulated variable of the plant,
 wherein a feedback control system including a second feedback controller into which a difference between the set point and the controlled variable is input, and a disturbance feedback that outputs a difference between an output of a nominal plant into which an output of the second feedback controller is input, and the controlled variable, with multiplying by a feedback gain L, is equivalently converted to the set point filter type two degrees of freedom PID control system,
 a transfer function F of the filter and a transfer function K' of the first feedback controller are configured to be determined by following equations 9 and 10 based on the feedback gain L, a transfer function K of the second feedback controller, and a transfer function Pn of the nominal plant, $$K' = L + K + LP_n K \quad (9)$$

$$F = \frac{K + LP_n K}{L + K + LP_n K}. \quad (10)$$

11. The control device according to claim 10, wherein a derivative time of the transfer function of the filter and the transfer function of the first feedback controller is 0,
 the transfer function of the nominal plant is a first order transfer function, and
 the transfer function of the second feedback controller is determined based on a gain and time constant of the nominal plant.

* * * * *

UNITED STATES PATENT AND TRADEMARK OFFICE
CERTIFICATE OF CORRECTION

PATENT NO. : 10,409,229 B2  
APPLICATION NO. : 14/679588  
DATED : September 10, 2019  
INVENTOR(S) : Fukiko Kawai Page 1 of 1

It is certified that error appears in the above-identified patent and that said Letters Patent is hereby corrected as shown below:

In the Specification

Change Column 11, Line 6, from "... be $u_c$," to --... be $u_e$,--.

Signed and Sealed this  
Eleventh Day of February, 2020

Andrei Iancu  
*Director of the United States Patent and Trademark Office*